(12) United States Patent
Okajima

(10) Patent No.: US 11,752,759 B2
(45) Date of Patent: Sep. 12, 2023

(54) PRINTING APPARATUS AND PRINT PRODUCING METHOD

(71) Applicant: SEIKO EPSON CORPORATION, Tokyo (JP)

(72) Inventor: Masakazu Okajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 17/521,961

(22) Filed: Nov. 9, 2021

(65) Prior Publication Data

US 2022/0143972 A1 May 12, 2022

(30) Foreign Application Priority Data

Nov. 11, 2020 (JP) ................................. 2020-187668

(51) Int. Cl.
*B41J 2/045* (2006.01)
(52) U.S. Cl.
CPC ....... *B41J 2/04508* (2013.01); *B41J 2/04586* (2013.01)

(58) Field of Classification Search
CPC . B41J 2/04505; B41J 2/04508; B41J 2/04586
See application file for complete search history.

(56) References Cited

U.S. PATENT DOCUMENTS

| 9,836,675 | B2 | 12/2017 | Fukazawa et al. | |
| 11,167,563 | B2* | 11/2021 | Kouzaki | B41J 2/04586 |
| 2016/0243862 | A1* | 8/2016 | Yoshida | B41J 2/2132 |

FOREIGN PATENT DOCUMENTS

JP 2015-168086 A 9/2015

* cited by examiner

*Primary Examiner* — Thinh H Nguyen
(74) *Attorney, Agent, or Firm* — Global IP Counselors, LLP

(57) ABSTRACT

A printing apparatus includes a first head and a second head provided in different positions in a sub-scanning direction. The printing apparatus performs, using the second head without using the first head, formation of an image in a third region present on a lower end side from a second region. A rate of use of the first head to the second head has a tendency of decreasing from an upper end side toward the lower end side in the sub-scanning direction in the second region.

8 Claims, 14 Drawing Sheets

FIG. 13

MEDIA FEEDING AMOUNT FOR ABSORBING
DIFFERENCE IN PAGE HEIGHT: SMALLEST

|  | RATIO OF USE R1 OF FIRST HEAD | RATIO OF USE R2 OF SECOND HEAD | R0 (R1/R2) |
|---|---|---|---|
| (h)-TH PATH | 50% | 50% | 1.000 |
| (i-3)-TH PATH | 50% | 50% | 1.000 |
| (i-2)-TH PATH | 50% | 50% | 1.000 |
| (i-1)-TH PATH | 50% | 50% | 1.000 |
| (i)-TH PATH | 50% | 50% | 1.000 |
| (i+1)-TH PATH | 52% | 48% | 1.071 |
| (i+2)-TH PATH | 52% | 48% | 1.071 |
| (i+3)-TH PATH | 52% | 48% | 1.071 |
| (i+4)-TH PATH | 52% | 48% | 1.071 |
| (j)-TH PATH | 31% | 69% | 0.455 |
| (j+1)-TH PATH | 31% | 69% | 0.455 |
| (j+2)-TH PATH | 31% | 69% | 0.455 |
| (j+3)-TH PATH | 31% | 69% | 0.455 |
| (j+4)-TH PATH | 24% | 76% | 0.308 |
| (j+5)-TH PATH | 24% | 76% | 0.308 |
| (j+6)-TH PATH | 24% | 76% | 0.308 |
| (j+7)-TH PATH | 24% | 76% | 0.308 |
| (j+8)-TH PATH | 12% | 88% | 0.133 |
| (k)-TH PATH | 10% | 90% | 0.115 |
| (k+1)-TH PATH | 0% | 100% | 0.000 |
| (k+2)-TH PATH | 0% | 100% | 0.000 |

FIG. 14

MEDIA FEEDING AMOUNT FOR ABSORBING
DIFFERENCE IN PAGE HEIGHT: LARGEST

|  | RATIO OF USE R1 OF FIRST HEAD | RATIO OF USE R2 OF SECOND HEAD | R0 (R1/R2) |
|---|---|---|---|
| (h)-TH PATH | 50% | 50% | 1.000 |
| (i-4)-TH PATH | 50% | 50% | 1.000 |
| (i-3)-TH PATH | 50% | 50% | 1.000 |
| (i-2)-TH PATH | 50% | 50% | 1.000 |
| (i-1)-TH PATH | 50% | 50% | 1.000 |
| (i)-TH PATH | 50% | 50% | 1.000 |
| (i+1)-TH PATH | 47% | 53% | 0.882 |
| (i+2)-TH PATH | 45% | 55% | 0.833 |
| (i+3)-TH PATH | 44% | 56% | 0.789 |
| (j)-TH PATH | 41% | 59% | 0.682 |
| (j+1)-TH PATH | 37% | 63% | 0.591 |
| (j+2)-TH PATH | 35% | 65% | 0.545 |
| (j+3)-TH PATH | 33% | 67% | 0.500 |
| (j+4)-TH PATH | 24% | 76% | 0.308 |
| (j+5)-TH PATH | 24% | 76% | 0.308 |
| (j+6)-TH PATH | 24% | 76% | 0.308 |
| (j+7)-TH PATH | 24% | 76% | 0.308 |
| (j+8)-TH PATH | 12% | 88% | 0.133 |
| (k)-TH PATH | 10% | 90% | 0.115 |
| (k+1)-TH PATH | 0% | 100% | 0.000 |
| (k+2)-TH PATH | 0% | 100% | 0.000 |

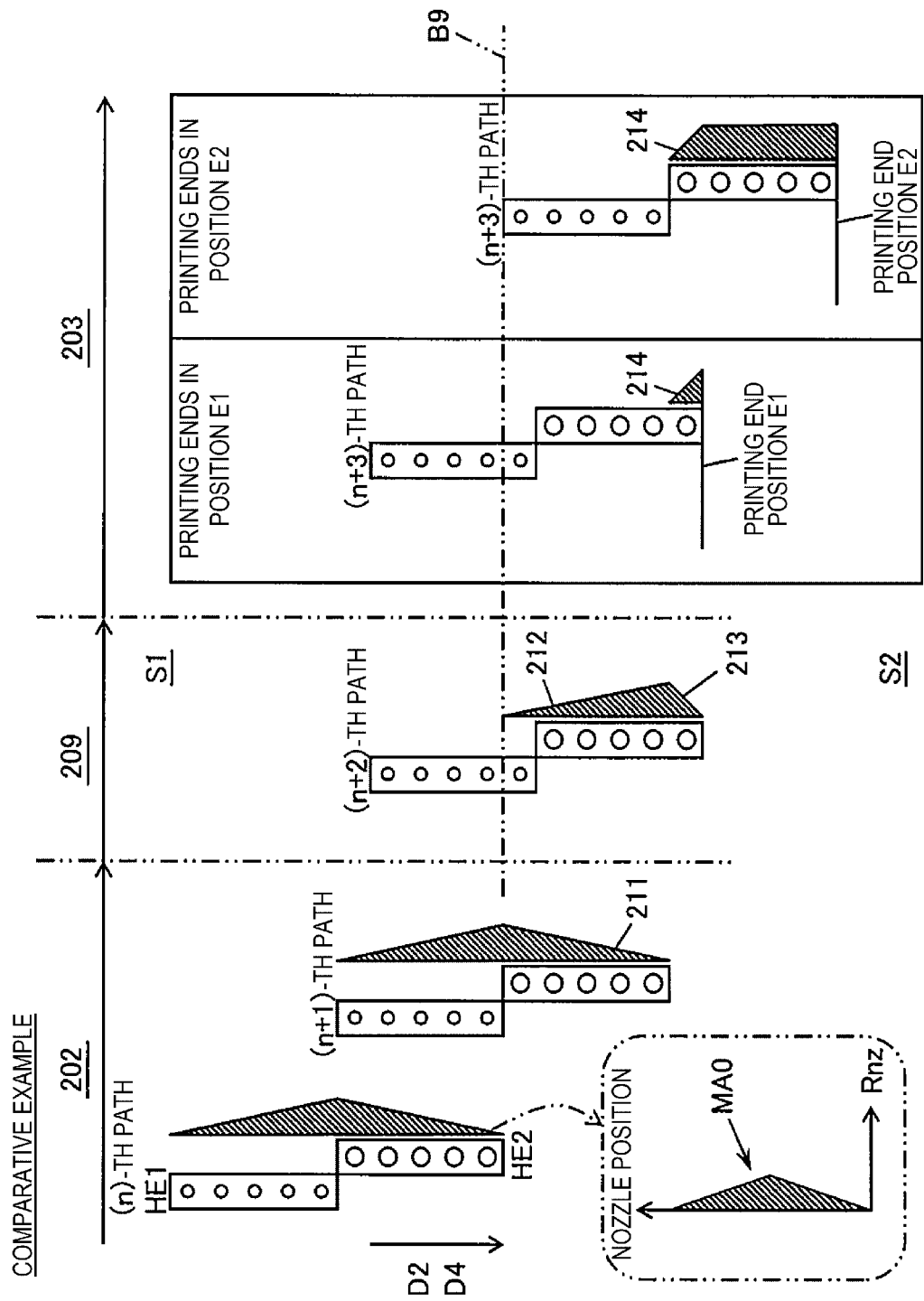

PRINTING APPARATUS AND PRINT PRODUCING METHOD

The present application is based on, and claims priority from JP Application Serial Number 2020-187668, filed Nov. 11, 2020, the disclosure of which is hereby incorporated by reference herein in its entirety.

BACKGROUND

1. Technical Field

The present disclosure relates to a printing apparatus including a plurality of heads provided in different positions in a sub-scanning direction and a print producing method.

2. Related Art

As a printing apparatus, there has been known a serial printer that repeats main scanning for moving a printing head, which ejects ink droplets, in a main scanning direction and sub-scanning for feeding a medium, on which a print image is formed by the ink droplets ejected from the printing head, in a paper feeding direction. A sub-scanning direction, which is a relative moving direction of the printing head at the time of the sub-scanning based on the medium, is a direction opposite to the paper feeding direction. In order to improve printing speed of the serial printer, a plurality of printing heads are provided in different positions in the sub-scanning direction.

As a reference, a serial printer disclosed in JP-A-2015-168086 (Patent Literature 1) performs partial overlap printing for performing printing for one band in one time of scanning of a printing head and, thereafter, conveying a sheet in a sub-scanning direction by width smaller than a sub-scanning direction width of one band and performing printing for the next one band in the next one time of scanning of the printing head. The serial printer generates upper nozzle printing data and lower nozzle printing data corrected according to concentration of image data in a superimposed region printed by a plurality of times of scanning.

When the serial printer performs the partial overlap printing using the plurality of printing heads disposed in the different positions in the sub-scanning direction, the concentration of a print image at an end portion where the number of usable printing heads is limited fluctuates if there is fluctuation in volumes or the like of inks ejected from the printing heads. In order to suppress the concentration fluctuation, it is conceivable to grasp fluctuation of the printing heads at the time of manufacturing and change an occurrence ratio of ink dots for each of the printing heads or each of rasters based on the fluctuation. However, it has been found that, even if the occurrence ratio of the ink dots is changed for each of the printing heads or each of the rasters, unevenness sometimes occurs in the concentration of a print image because of an external environment such as an environment temperature.

SUMMARY

A printing apparatus according to an aspect of the present disclosure includes: a first head; a second head provided in a position different from a position of the first head in a sub-scanning direction; and a control section configured to perform formation of an image by ejecting ink from the first head and the second head. The control section performs, using the first head and the second head, formation of the image in a first region and a second region present on a lower end side in the sub-scanning direction from the first region and performs, using the second head without using the first head, formation of the image in a third region present on the lower end side from the second region. A rate of use of the first head to the second head has a tendency of decreasing from an upper end side toward the lower end side in the sub-scanning direction in the second region.

A printing apparatus according to an aspect of the present disclosure includes: a first head; a second head provided in a position different from a position of the first head in a sub-scanning direction; and a control section configured to perform formation of an image by ejecting ink from the first head and the second head while relatively moving the first head and the second head in a main scanning direction. Assuming that i<j<k, where i, j, and k are numbers indicating order of main scanning of the first head and the second head for the image, the control section performs formation of a part of the image using the first head and the second head in an i-th path to a k-th path and performs formation of a part of the image using the second head without using the first head in k+1-th and subsequent paths. A rate of use of the first head to the second head has a tendency of decreasing as a path number increases in a j-th path to a k-th path.

A print producing method according to an aspect of the present disclosure is a print producing method for producing, using a first head and a second head provided in a position different from a position of the first head in a sub-scanning direction, a print including an image by ejecting ink from the first head and second head. The print producing method includes: a first step of performing, using the first head and the second head, formation of the image in a first region and a second region present on a lower end side in the sub-scanning direction from the first region; and a second step of performing, using the second head without using the first head, formation of the image in a third region present on the lower end side from the second region. In the first step, a rate of use of the first head to the second head has a tendency of decreasing from an upper end side toward the lower end side in the sub-scanning direction in the second region.

A print producing method according to an aspect of the present disclosure is a print producing method for producing, using a first head and a second head provided in a position different from a position of the first head in a sub-scanning direction, a print including an image by ejecting ink from the first head and second head while relatively moving the first head and the second head in a main scanning direction. The print producing method includes, assuming that i<j<k, where i, j, and k are numbers indicating order of main scanning of the first head and the second head for the image: a first step of performing formation of a part of the image using the first head and the second head in an i-th path to a k-th path; and a second step of performing formation of a part of the image using the second head without using the first head in k+1-th and subsequent paths. In the first step, formation of a part of the image is performed using the first head and the second head such that a rate of use of the first head to the second head has a tendency of decreasing as a path number increases in a j-th path to a k-th path.

BRIEF DESCRIPTION OF THE DRAWINGS

FIG. 13 is a diagram schematically showing an example of rates of use of the first head corresponding to paths.

FIG. 14 is a diagram schematically showing an example of rates of use of the first head corresponding to the paths.

FIG. 15 is a diagram schematically illustrating a recording method from the normal processing section until printing ends in a comparative example.

DESCRIPTION OF EXEMPLARY EMBODIMENTS

An embodiment of the present disclosure is explained below. Naturally, the embodiment explained below only illustrates the present disclosure. Not all of characteristics described in the embodiment are essential for solving means of the present disclosure.

(1) OVERVIEW OF A TECHNIQUE INCLUDED IN THE PRESENT DISCLOSURE

First, an overview of a technique included in the present disclosure is explained with reference to examples shown in FIGS. 1 to 15. The figures of this application are figures schematically showing examples. Enlargement ratios in directions shown in the figures are sometimes different. The figures are sometimes inconsistent. Naturally, elements of the present technique are not limited to specific examples indicated by signs. In an "overview of a technique included in the present disclosure", descriptions in parentheses mean supplementary explanations of immediately preceding words.

Aspect 1

Figure 11:
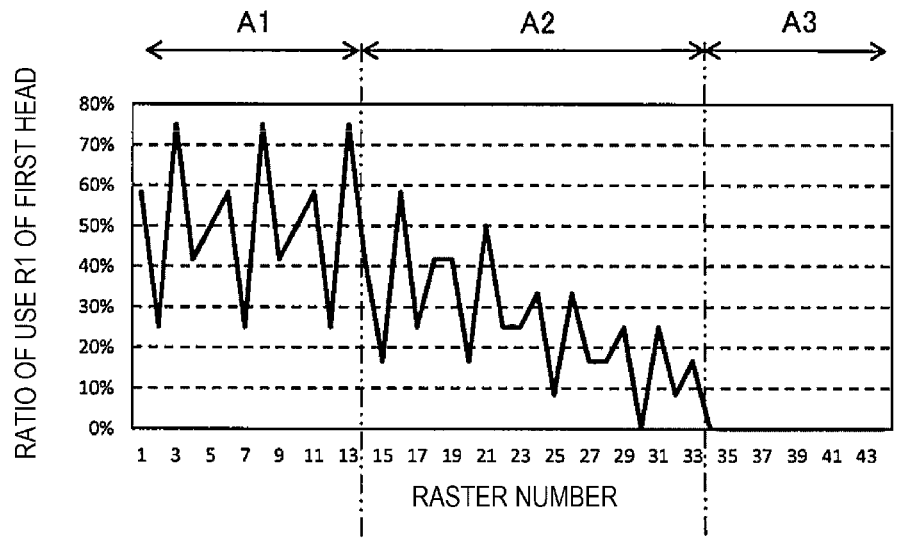
FIG. 11 is a diagram schematically showing an example of ratios of use of the first head corresponding to positions of rasters.
Figure 12:
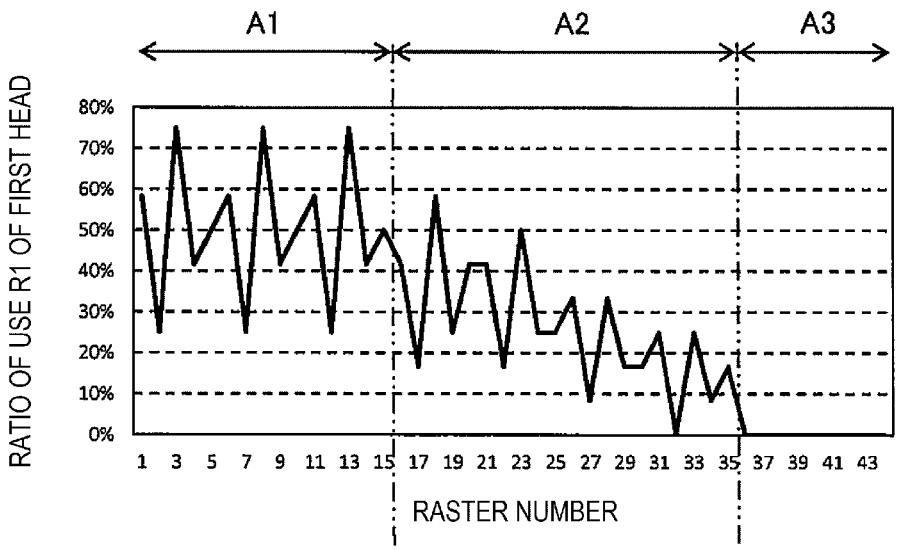
FIG. 12 is a diagram schematically showing an example of ratios of use of the first head corresponding to the positions of the rasters.

A printing apparatus 1 according to an aspect of the present technique includes a first head HE1, a second head HE2 provided in a position different from the position of the first head HE1 in a sub-scanning direction D2, and a control section U0 that performs formation of an image IM0 by ejecting ink 36 from the first head HE1 and the second head HE2. The control section U0 performs, using the first head HE1 and the second head HE2, formation of the image IM0 in a first region A1 and a second region A2 present on a lower end side S2 in the sub-scanning direction D2 from the first region A1. The control section U0 performs, using the second head HE2 without using the first head HE1, formation of the image IM0 in a third region A3 present on the lower end side S2 from the second region A2. As illustrated in FIGS. 11 and 12, in the printing apparatus 1, a rate of use of the first head HE1 to the second head HE2 has a tendency of decreasing from an upper end side S1 toward the lower end side S2 in the sub-scanning direction D2 in the second region A2. When a ratio of use of the first head HE1 to both the heads HE1 and HE2 is represented as R1 and a ratio of use of the second head HE2 to both the heads HE1 and HE2 is represented as R2, a rate of use (R0) of the first head HE1 to the second head HE2 is represented by R1/R2. Therefore, when the ratio of use R1 of the first head HE1 has a tendency of decreasing from the upper end side S1 toward the lower end side S2, the rate of use R0 of the first head HE1 to the second head HE2 is considered to have a decreasing tendency.

Figure 2:
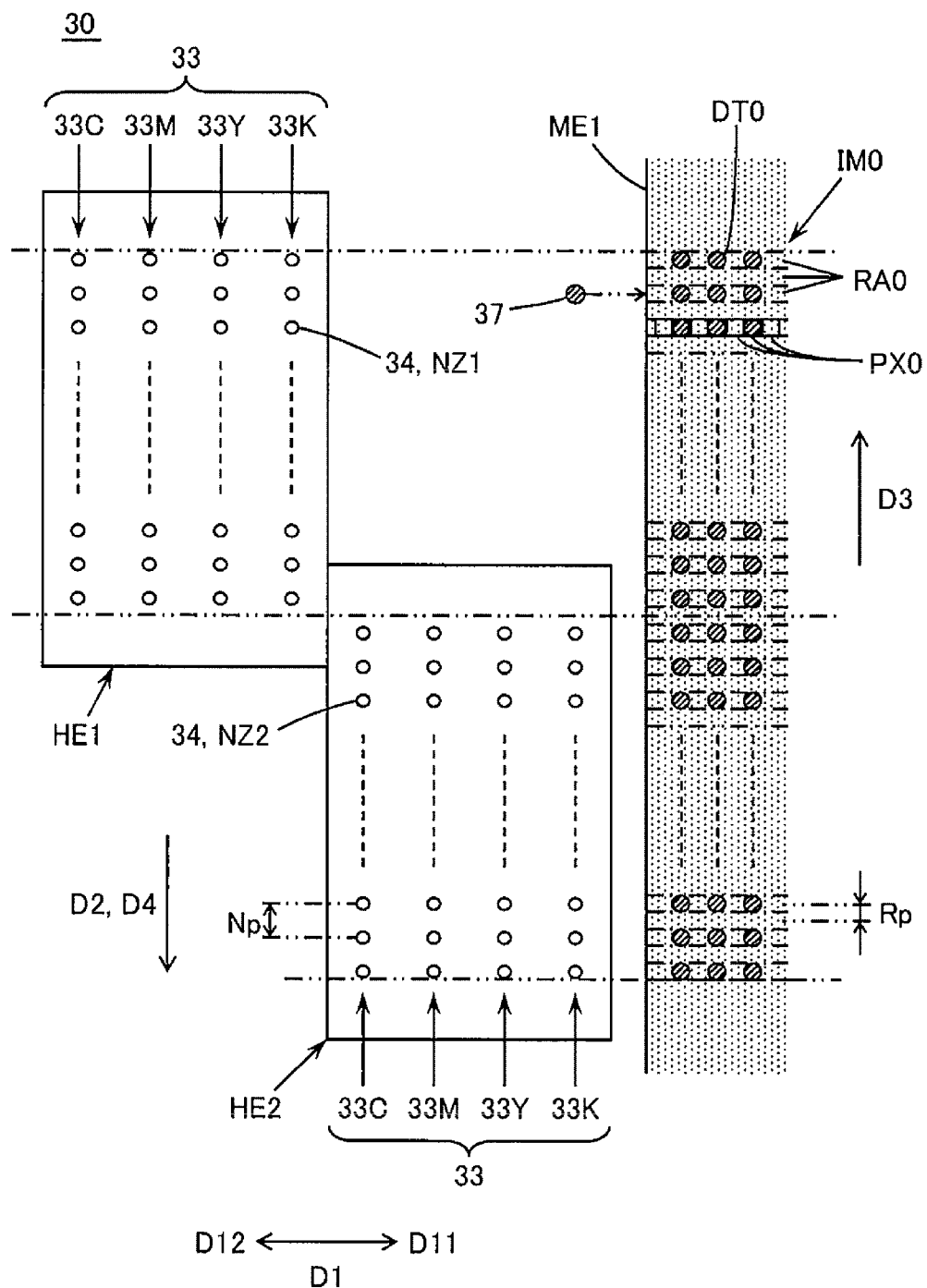
FIG. 2 is a diagram schematically showing an example of a relation between pluralities of nozzles provided in a first head and a second head and a plurality of dots forming an image on a medium.
Figure 3:
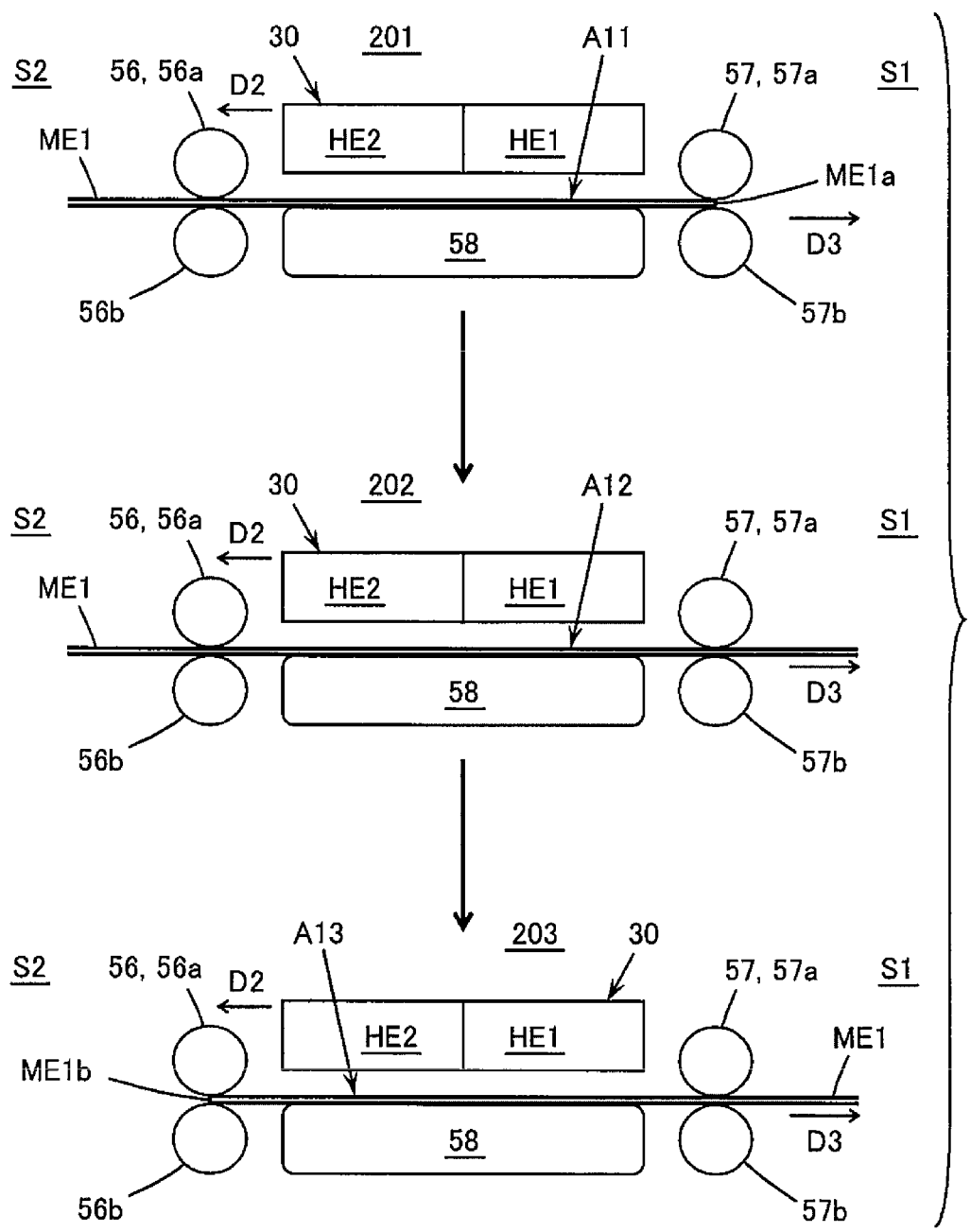
FIG. 3 is a diagram schematically showing an example of positional relations between the heads and the medium in an upper end processing section, a normal processing section, and a lower end processing section.
Figure 4:
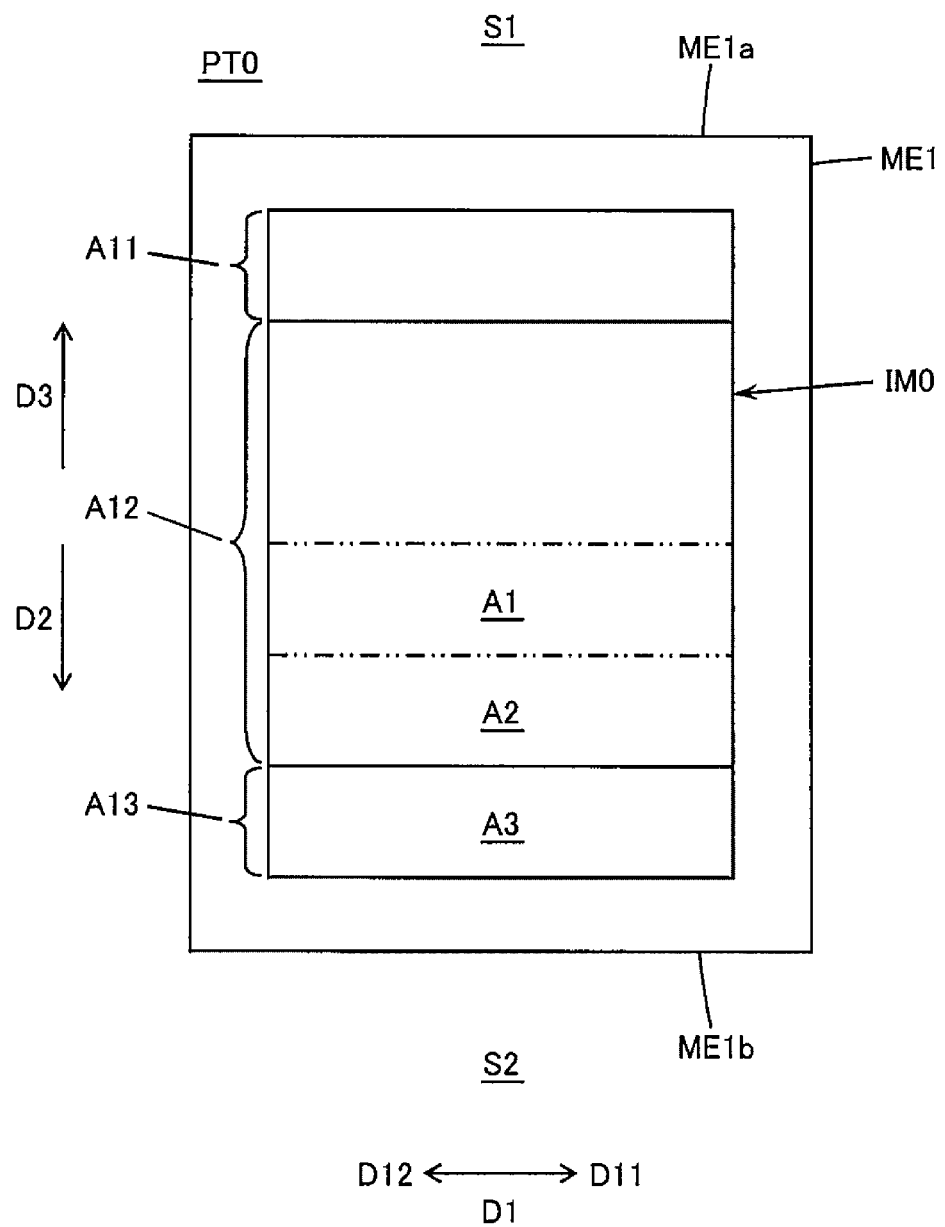
FIG. 4 is a diagram schematically showing an example of a print including an image on a medium.

For example, it is assumed that, as shown in FIG. 2, a printing apparatus includes a plurality of heads HE1 and HE2 in different positions in the sub-scanning direction D2. In order to form a high-definition image IM0 on a medium ME1, it is necessary to hold the medium ME1 with roller pairs 56 and 57 or the like on both outer sides of the heads HE1 and HE2 in the sub-scanning direction D2. Accordingly, as illustrated in FIGS. 3 and 4, an upper end region A11 used by only the first head HE1 is generated in the image IM0 near an upper end ME1a of the medium ME1 and a lower end region A13 used by only the second head HE2 is generated in the image IM0 near a lower end ME1b of the medium ME1. Both the heads HE1 and HE2 are used for formation of the image IM0 in a normal region A12 between the upper end region A11 and the lower end region A13.

When there is fluctuation in volumes or the like of inks ejected from the heads HE1 and HE2, a concentration difference occurs between the upper end region A11 and the normal region A12 where only the first head HE1 is used and a concentration difference occurs between the lower end region A13 and the normal region A12 where only the second head HE2 is used. In order to suppress the concentration differences, an experiment for adjusting an occurrence ratio of ink dots for each of rasters was performed. It has been found that unevenness sometimes occurs in the concentration of the image IM0 because of an external environment such as an environment temperature. Even if the concentration difference can be suppressed by adjusting the ink dot occurrence ratio in a certain environment, in a different environment, a concentration difference occurs between the lower end region A13 and the normal region A12 and a boundary along a main scanning direction D1 due to a sudden change in concentration is visually recognized.

In the aspect 1 of the present technique, as illustrated in FIGS. 11 and 12, the rate of use of the first head HE1 to the second head HE2 has a tendency of decreasing from the upper end side S1 toward the lower end side S2 in the sub-scanning direction D2 in the second region A2 where the first head HE1 and the second head HE2 are used. Consequently, a sudden change in concentration due to a concentration difference between the first region A1 where the first head HE1 and the second head HE2 are used and the third region A3 where the first head HE1 is not used is suppressed. The boundary along the main scanning direction D1 is inconspicuous. Therefore, in the aspect 1, unevenness of an image formed when a plurality of heads are present in different positions in the sub-scanning direction can be reduced.

A certain region being present on the lower end side in the sub-scanning direction from a start point means that the region is present in a relative moving direction of the first head and the second head at the time of sub-scanning from the start point. A certain region being present on the upper end side in the sub-scanning direction from the start point means that the region is present on the opposite direction of the relative moving direction of the first head and the second head at the time of the sub-scanning from the start point.

A rate of use of the first head having a tendency of decreasing from the upper end side to the lower end side includes unevenness being present in a change of the rate of use of the first head when viewed in a raster unit. For example, even if the rate of use of the first head is larger in the next raster of a certain raster, if the rate of use of the first head decreases from the upper end side toward the lower end side macroscopically, the rate of use of the first head is considered to have a tendency of decreasing from the upper end side to the lower end side.

The above note is also applied in aspects described below.

Aspect 2

A printing apparatus 1 according to another aspect of the present technique includes a first head HE1, a second head HE2 provided in a position different from the position of the first head HE1 in a sub-scanning direction D2, and a control section U0 that performs formation of an image IM0 by ejecting ink 36 from the first head HE1 and the second head HE2 while relatively moving the first head HE1 and the second head HE2 in a main scanning direction D1. Assuming that i<j<k, where i, j, and k are numbers indicating order of main scanning of the first head HE1 and the second head HE2 for the image IM0, the control section U0 performs formation of a part of the image IM0 using the first head HE1 and the second head HE2 in an i-th path to a k-th path and performs formation of a part of the image IM0 using the second head HE2 without using the first head HE1 in k+1-th and subsequent paths. As illustrated in FIGS. 13 and 14, a rate of use R0 of the first head HE1 to the second head HE2 has a tendency of decreasing as a path number increases in a j-th path to a k-th path.

In the aspect 2, the rate of use R0 of the first head HE1 to the second head HE2 has the tendency of decreasing as the path number increases in the j-th path to the k-th path in which the first head HE1 and the second head HE2 are used. Consequently, a sudden change in concentration due to a concentration difference between the image IM0 of a portion formed in the i-th path to a j−1-th path in which the first head HE1 and the second head HE2 are used and the image IM0 of a portion formed in the k+1-th and subsequent paths in which the first head HE1 is not used is suppressed. The boundary along the main scanning direction D1 is inconspicuous. Therefore, in the aspect 2, unevenness of an image formed when a plurality of heads are present in different positions in the sub-scanning direction can be reduced.

A rate of use of the first head having a tendency of decreasing as a path number increases includes unevenness being present in a change of the rate of use of the first head when viewed in a path unit. This note is also applied in the aspects described below.

Aspect 3

Figure 9:
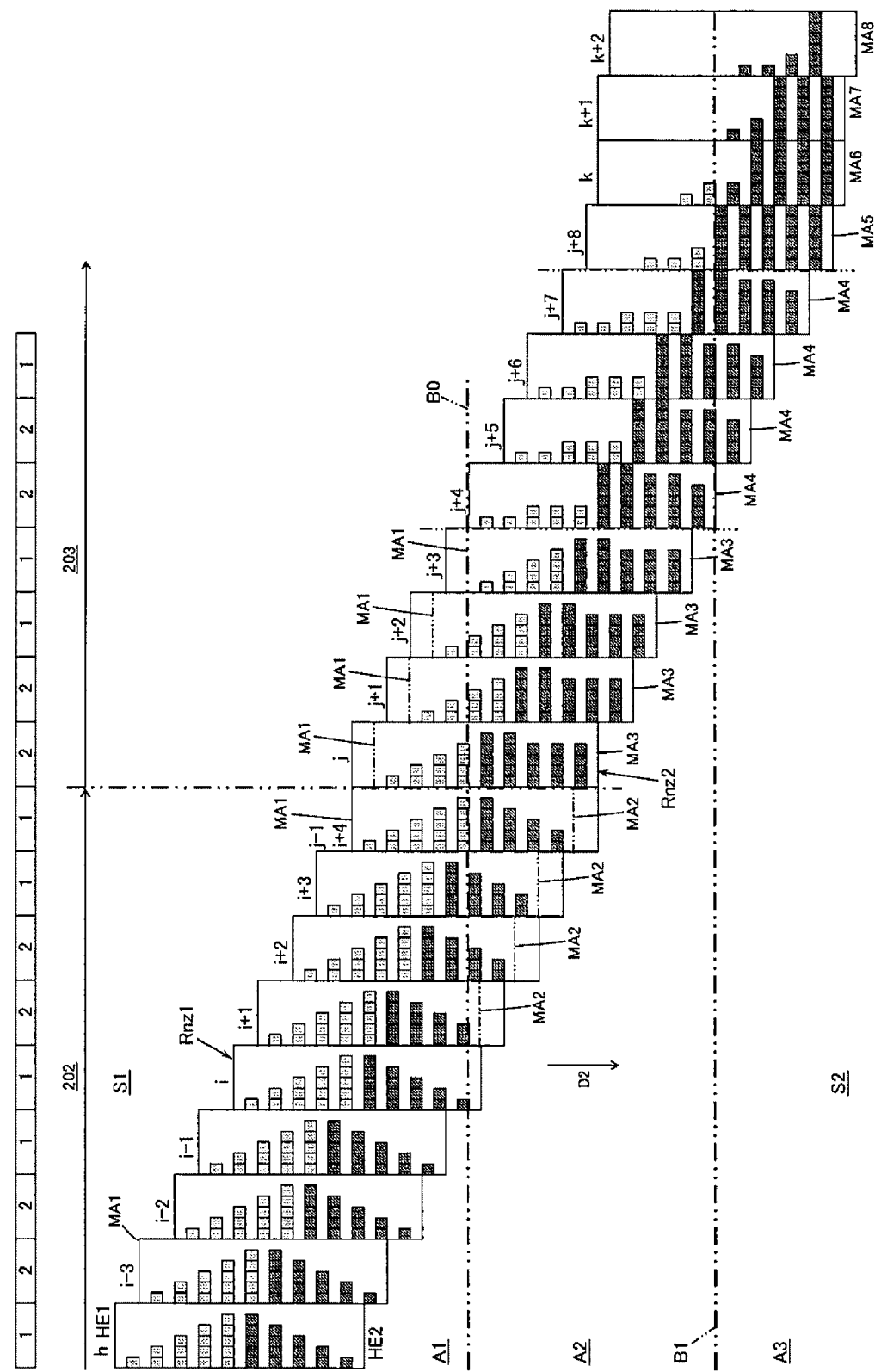
FIG. 9 is a diagram schematically showing an example of rates of use by nozzle of paths in the normal processing section to the lower end processing section.

As illustrated in FIG. 9, the control section U0 may set a relative movement amount of the sub-scanning of the first head HE1 and the second head HE2 between the j−1-th path and the j-th path smaller than a relative movement amount of the sub-scanning of the first head HE1 and the second head HE2 up to the j−1-th path. In this aspect, since the sub-scanning can be aligned with the lower end of the formed image IM0, it is possible to provide a suitable example in which unevenness of an image formed in a lower end processing section is reduced.

Aspect 4

Figure 10:
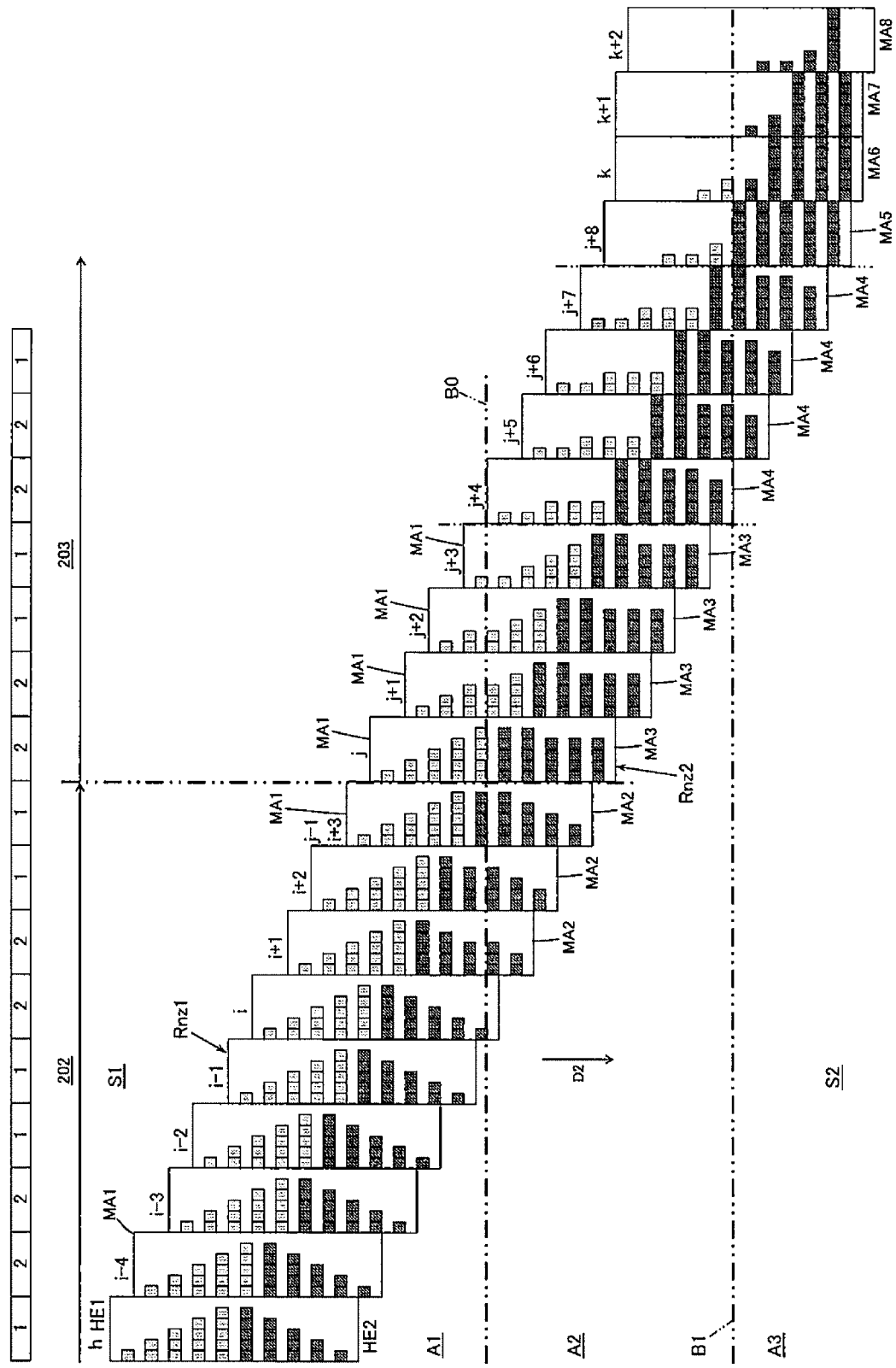
FIG. 10 is a diagram schematically showing an example of rates of use by nozzle of paths in the normal processing section to the lower end processing section.

As illustrated in FIG. 2, the first head HE1 may include a plurality of first nozzles NZ1 in different positions in the sub-scanning direction D2. The second head HE2 may include a plurality of second nozzles NZ2 in different positions in the sub-scanning direction D2. A rate of use of the first nozzles NZ1 and the second nozzles NZ2 with respect to a raster RA0 along the main scanning direction D1 is set as a rate of use by nozzle Rnz. As illustrated in FIGS. 9 and 10, a boundary B0 is set between the plurality of first nozzles NZ1 and the plurality of second nozzles NZ2 in the j-th path. The control section U0 may set the rate of use by nozzle Rnz to a first rate of use Rnz1 and perform formation of a part of the image IM0 in an h-th path before the i-th path to the i-th path. The control section U0 may set the rate of use by nozzle Rnz to a second rate of use Rnz2 different from the first rate of use Rnz1 and perform formation of a part of the image IM0 in the j-th and subsequent paths. The control section U0 may set the rate of use by nozzle Rnz about the first nozzles NZ1 present further on the upper end side S1 in the sub-scanning direction D2 than the boundary B0 in the j-th and subsequent paths to transition of the first rate of use Rnz1 adjusted to a relative movement amount of the sub-scanning of the first head HE1 and the second head HE2 in the h-th path to the i-th path.

Consequently, even if a relative movement amount of the sub-scanning in the j−1-th and subsequent paths changes from a relative movement amount of the sub-scanning before the j−1-th path, the transition of the first rate of use Rnz1 is maintained further on the upper end side S1 than the boundary B0. Therefore, this aspect can improve the quality of an image in the first region.

Aspect 5

Further, as illustrated in FIGS. 9 and 10, the control section U0 may set the rate of use by nozzle Rnz about the second nozzles NZ2 present further on the lower end side S2 in the sub-scanning direction D2 than the boundary B0 before the j−1-th path to a rate of use different from the first rate of use Rnz1. Consequently, a degree of freedom of the rate of use by nozzle Rnz increases further on the lower end side S2 than the boundary B0 even before the j−1-th path. Therefore, it is possible to provide a more suitable example for reducing unevenness of an image formed in the lower end processing section.

Aspect 6

As illustrated in FIG. 2 and the like, the second head HE2 may be located further on the lower end side S2 in the sub-scanning direction D2 than the first head HE1. This aspect can provide a suitable example for reducing unevenness of a formed image.

Aspect 7

A print producing method according to an aspect of the present technique is a print producing method for producing, using a first head HE1 and a second head HE2 provided in a position different from the position of the first head HE1 in a sub-scanning direction D2, a print PT0 including an image IM0 by ejecting ink 36 from the first head HE1 and the second head HE2. The print producing method includes steps described below.

(A) A first step of performing, using the first head HE1 and the second head HE2, formation of the image IM0 in a first region A1 and a second region A2 present on a lower end side S2 in the sub-scanning direction D2 from the first region A1.

(B) A second step of performing, using the second head HE2 without using the first head HE1, formation of the image IM0 in the third region A3 present on the lower end side S2 from the second region A2.

In the first step, as illustrated in FIGS. 11 and 12, the formation of the image IM0 in the second region A2 is performed such that a rate of use of the first head HE1 to the second head HE2 has a tendency of decreasing from an upper end side S1 toward the lower end side S2 in the sub-scanning direction D2 in the second region A2.

In the aspect 7, the formation of the image IM0 in the second region A2 is performed such that a rate of use of the first head HE1 to the second head HE2 has a tendency of decreasing from the upper end side S1 toward the lower end side S2 in the sub-scanning direction D2 in the second region A2 where the first head HE1 and the second head HE2 are used. Consequently, a sudden change in concentration due to a concentration difference between the first region A1 where the first head HE1 and the second head HE2 are used and the third region A3 where the first head HE1 is not used is suppressed. A boundary along the main scanning direction D1 is inconspicuous. Therefore, in the aspect 7, it is possible to produce a print with less unevenness of an image formed when a plurality of heads are present in different positions in the sub-scanning direction. In the aspect 7, the steps may be simultaneously performed.

Aspect 8

A print producing method according to another aspect of the present technique is a print producing method for producing, using a first head HE1 and a second head HE2 provided in a position different from the position of the first head HE1 in a sub-scanning direction D2, a print PTO including an image IM0 by ejecting ink 36 from the first head HE1 and second head HE2 while relatively moving the first head HE1 and the second head HE2 in a main scanning direction D1. Assuming that i<j<k, where i, j, and k are numbers indicating the order of main scanning of the first head HE1 and the second head HE2 for the image IM0, the print producing method includes steps described below.

(A) A first step of performing formation of a part of the image IM0 using the first head HE1 and the second head HE2 in an i-th path to a k-th path.

(B) A second step of performing formation of a part of the image IM0 using the second head HE2 without using the first head HE1 in k+1-th and subsequent paths.

In the first step, formation of a part of the image IM0 is performed using the first head HE1 and the second head HE2 such that a rate of use of the first head HE1 to the second head HE2 has a tendency of decreasing as the path number increases in a j-th path to a k-th path.

In the aspect 8, the formation of a part of the image IM0 is performed using the first head HE1 and the second head HE2 such that the rate of use of the first head HE1 to the second head HE2 has the tendency of decreasing as the path number increases in the j-th path to the k-th path in which the first head HE1 and the second head HE2 are used. Consequently, a sudden change in concentration due to a concentration difference between the image IM0 of a portion formed in the i-th path to a j−1-th path in which the first head HE1 and the second head HE2 are used and the image IM0 of a portion formed in the k+1-th and subsequent paths in which the first head HE1 is not used is suppressed. A boundary along the main scanning direction D1 is inconspicuous. Therefore, in the aspect 8 as well, it is possible to produce a print with less unevenness of an image formed when a plurality of heads are present in different positions in the sub-scanning direction.

Further, the present technique is applicable to a control method for the printing apparatus, a control program for the printing apparatus, a computer-readable recording medium recording the control program, and the like. The printing apparatus may be configured by a distributed plurality of portions.

(2) SPECIFIC EXAMPLE OF THE PRINTING APPARATUS

Figure 1:
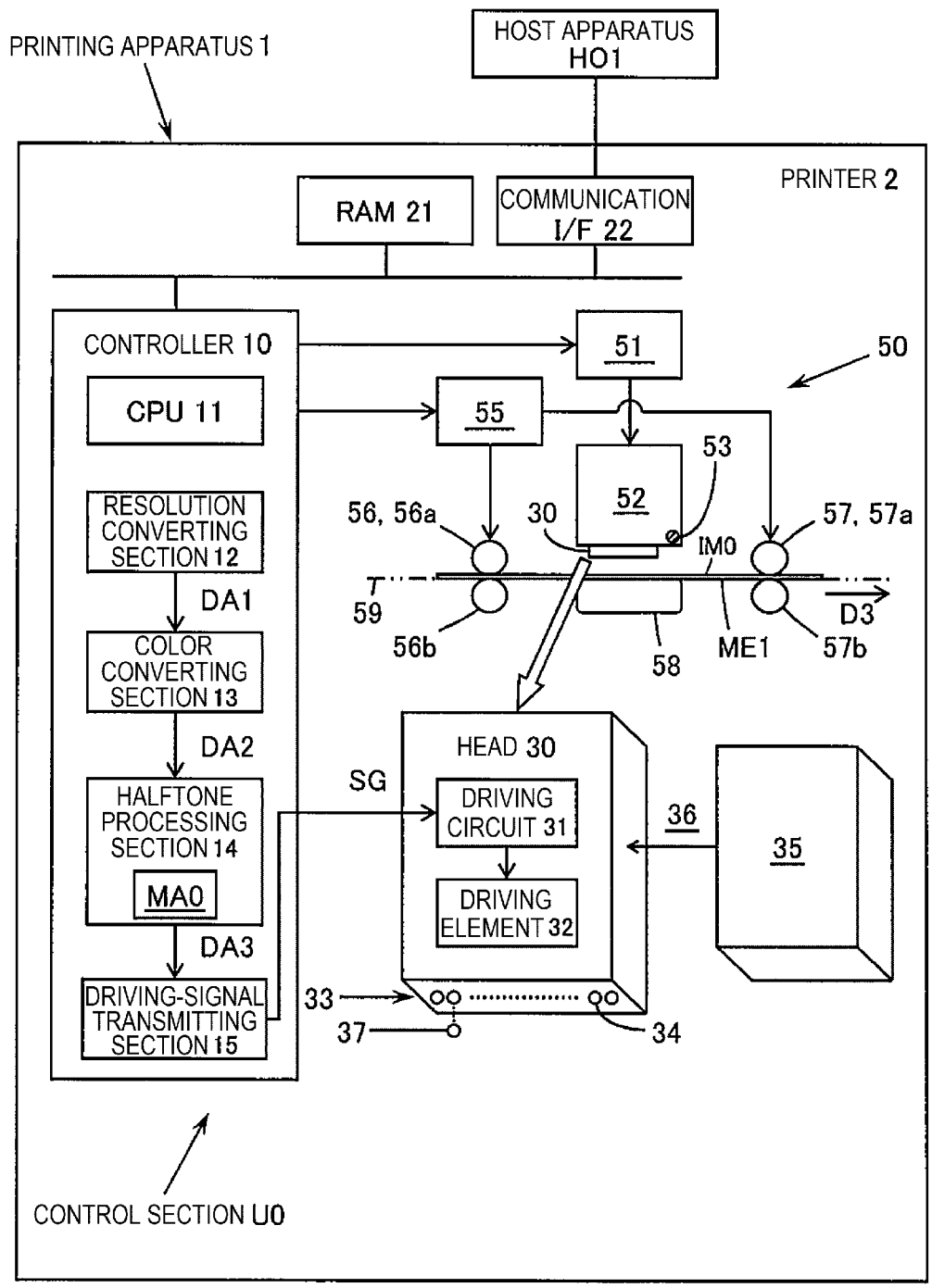
FIG. 1 is a diagram schematically showing a configuration example of a printing apparatus.

FIG. 1 schematically illustrates the configuration of a printer 2 functioning as the printing apparatus 1. The printer 2 shown in FIG. 1 is coupled to a host apparatus HO1. In an example shown in FIG. 1, the printer 2 includes a halftone processing section 14. However, the halftone processing section 14 and the like may be included in the host apparatus HO1. When the halftone processing section 14 and the like are included in the host apparatus HO1, both of the host apparatus HO1 and the printer 2 configure the printing apparatus 1. The printing apparatus 1 may include additional elements not shown in FIG. 1.

In FIG. 1, a serial printer, which is a type of an inkjet printer, is shown as the printer 2. The printer 2 includes a controller 10, a RAM 21 including a buffer, a communication I/F 22, a head 30, and a driving section 50. RAM is an abbreviation of Random Access Memory. I/F is an abbreviation of interface. The controller 10, the RAM 21, and the communication I/F 22 are coupled to a bus and capable of inputting and outputting information to and from each other. The printer 2 including the controller 10, the RAM 21, and the driving section 50 includes the control section U0.

The controller 10 includes a CPU 11, a resolution converting section 12, a color converting section 13, a halftone processing section 14, and a driving-signal transmitting section 15. CPU is an abbreviation of Central Processing Unit. The controller 10 controls, based on image data corresponding to the image IM0, main scanning and sub-scanning by the driving section 50 and ejection of ink droplets 37 by the head 30. The main scanning means a relative movement of the head 30 and the medium ME1 in the main scanning direction. The sub-scanning means a relative movement of the head 30 and the medium ME1 in a feeding direction D3. The ejection of the ink droplets 37 by the head 30 means formation of the image IM0 on the medium ME1 by the head 30. The controller 10 can be configured by another processor such as an SoC. SoC is an abbreviation of System on a Chip. The sections 12 to 15 of the controller 10 may be realized by executing firmware.

The CPU 11 is a device that mainly performs information processing and control in the printer 2.

The resolution converting section 12 converts the resolution of an input image from the host apparatus HO1 or the like into set resolution. The input image is represented by, for example, primary RGB data having integer values of multiple gradations of R, G, and B in pixels. R means red, G means green, and B means blue. The resolution converting section 12 converts the primary RGB data into input color gradation data DA1 of the set resolution. The input color gradation data DA1 Is represented by RGB data having integer values of multiple gradations of R, G, and B in pixels. As the numbers of gradations of the RGB data and the primary RGB data, there are $2^8$, $2^{16}$, and the like.

The color converting section 13 refers to, for example, a color conversion lookup table specifying a correspondence relation between gradation values of R, G, and B and gradation values of C, M, Y, and K and converts the input color gradation data DA1 into output color gradation data DA2 having integer values of multiple gradations of C, M, Y, and K in pixels. C means cyan, M means magenta, Y means yellow, and K means black. As the number of gradations of the output color gradation data DA2, there are $2^8$, $2^{16}$, and the like. The output color gradation data DA2 represents an amount use of the ink 36 for each of the pixels.

The halftone processing section 14 specifies partial data necessary for main scanning of respective times from the output color gradation data DA2, reduces, based on a dither mask MA0, the numbers of gradations of gradation values of pixels forming the partial data, and generates nozzle data DA3. A method of performing halftone processing of output color gradation data using a dither mask is called dither method. The nozzle data DA3 represents a formation state of dots. The nozzle data DA3 may be binary data representing presence or absence of formation of dots or may be multi-value data of three or more gradations adaptable to dots of different sizes such as small, medium, and large dots. The binary data can be, for example, data for causing 1 to correspond to dot formation and causing 0 to correspond to no dot. Quaternary data capable of representing pixels with two bits can be, for example, data for causing 3 to correspond to large dot formation, causing 2 to correspond to medium dot formation, causing 1 to correspond to small dot formation, and causing 0 to correspond to no dot.

The driving-signal transmitting section 15 generates, from the nozzle data DA3, a driving signal SG corresponding to a voltage signal applied to the driving element 32 of the head 30 and outputs the driving signal SG to a driving circuit 31. For example, if the nozzle data DA3 is "dot formation", the driving-signal transmitting section 15 outputs a driving signal for ejecting liquid droplets for dot formation. When the nozzle data DA3 is quaternary data, the driving-signal transmitting section 15 outputs a driving signal for ejecting liquid droplets for large dots if the nozzle data DA3 is "large dot formation", outputs a driving signal for ejecting liquid droplets for medium dots if the nozzle data DA3 is "medium dot formation", and outputs a driving signal for ejecting liquid droplets for small dots if the nozzle data DA3 is "small dot formation".

The sections 11 to 15 may be configured by an ASIC. The sections 11 to 15 may directly read processing target data from the RAM 21 or may directly write data after processing in the RAM 21. ASIC is an abbreviation of Application Specific Integrated Circuit.

The driving section 50 controlled by the controller 10 includes a carriage driving section 51, a carriage 52, a roller driving section 55, a conveying roller pair 56, a paper discharge roller pair 57, a platen 58 and the like. The driving section 50 causes the carriage 52 and the head 30 to reciprocate according to driving of the carriage driving section 51 and feeds the medium ME1 in the feeding direction D3 along a conveying path 59 according to driving of the roller driving section 55. In FIG. 1, the feeding direction D3 is the right direction. The left side is referred to as upstream and the right side is referred to as downstream. The carriage driving section 51 performs, according to control by the controller 10, main scanning for moving the carriage 52 and the head 30 in the main scanning direction D1 shown in FIG. 2 and the like. The roller driving section 55 performs sub-scanning for feeding the medium ME1 in the feeding direction D3 by rotating rollers 56a and 57a of the roller pairs 56 and 57 according to the control by the controller 10. The medium ME1 means a material for retaining a print image. The medium ME1 is generally paper but may be resin, metal, or the like. When the shape of the medium ME1 is a cut shape like cut paper, the shape is generally a rectangular shape. However, the shape of the medium ME1 may be an elliptical shape, a polygonal shape other than the rectangular shape, a three-dimensional shape, or the like.

The head 30 is mounted on the carriage 52. An ink cartridge 35, from which the ink 36 ejected as the ink droplets 37 is supplied to the head 30, may be mounted on the carriage 52. Naturally, the ink 36 may be supplied to the head 30 via a tube from the ink cartridge 35 set outside the carriage 52. The carriage 52 mounted with the head 30 is fixed to a not-shown endless belt and is movable in the main scanning direction D1 shown in FIG. 2 and the like along a guide 53. As shown in FIG. 2, the main scanning direction D1 collectively refers to a forward direction D11 and a backward direction D12 opposite to the forward direction D11. The guide 53 is a long member, a longitudinal direction of which is directed in the main scanning direction D1. The carriage driving section 51 is configured by a servomotor or the like including an encoder and moves the carriage 52 in the forward direction D11 and the backward direction D12 according to an instruction from the controller 10.

The conveying roller pair 56 present upstream of the head 30 includes a driving conveying roller 56a that comes into contact with one surface of the medium ME1 and a driven conveying roller 56b that comes into contact with the other surface of the medium ME1. At the time of the sub-scanning, the conveying roller pair 56 feeds the nipped medium ME1 to the head 30 with rotation of the driving conveying roller 56a.

The paper discharge roller pair 57 present downstream of the head 30 includes a driving paper discharge roller 57a that comes into contact with one surface of the medium ME1 and a driven paper discharge roller 57b that comes into contact with the other surface of the medium ME1. At the time of the sub-scanning, the paper discharge roller pair 57 conveys the nipped medium ME1 to a not-shown paper discharge tray with rotation of the driving paper discharge roller 57a.

The roller driving section 55 is configured by a servomotor or the like including an encoder and rotates the rollers 56a and 57a according to an instruction from the controller 10. The rollers 56a and 57a rotate to thereby feed the medium ME1 in the feeding direction D3.

The platen 58 supports the medium ME1 present in the conveying path 59. The head 30 controlled by the controller 10 performs printing by ejecting the ink droplets 37 to the medium ME1 supported by the platen 58. The head 30 includes a driving circuit 31 and a driving element 32. The driving circuit 31 applies a voltage signal to the driving element 32 according to the driving signal SG input from the driving-signal transmitting section 15. As the driving element 32, a piezoelectric element that applies pressure to the ink 36 in a pressure chamber communicating with nozzles 34, a driving element that generates bubbles in the pressure chamber with heat and ejects the ink droplets 37 from the nozzles 34 and the like can be used. A nozzle means a small hole from which the ink droplets 37 are jetted. The ink 36 is supplied to the pressure chamber of the head 30 from the ink cartridge 35. A combination of the ink cartridge 35 and the head 30 is provided for, for example, each of C, M, Y, and K. The ink 36 in the pressure chamber is ejected as the ink droplets 37 toward the medium ME1 from the nozzles 34 by the driving element 32. Consequently, dots of the ink droplets 37 are formed on the medium ME1. Dots conforming to the nozzle data DA3 are formed while the head 30 moves in the main scanning direction D1. Feeding of the medium ME1 in the conveying direction for one time of sub-scanning is repeated, whereby the image IM0 is formed on the medium ME1.

The RAM 21 is a large-capacity volatile semiconductor memory and stores an input image and the like received from the host apparatus HO1, a not-shown memory, or the like. The communication I/F 22 is coupled to the host apparatus HO1 by wire or radio and inputs and outputs information to and from the host apparatus HO1. The host apparatus HO1 includes a computer such as a personal computer or a tablet terminal, a cellular phone such as a smartphone, a digital camera, or a digital video camera.

FIG. 2 schematically illustrates a relation between a plurality of nozzles 34 provided in the head 30 and a plurality of dots DT0 forming the image IM0 on the medium ME1. As shown in FIG. 2, the head 30 includes the first head HE1 and the second head HE2 provided in a position different from the position of the first head HE1 in the sub-scanning direction D2. The sub-scanning direction D2 is a direction opposite to the feeding direction D3 of the medium ME1. The head 30 shown in FIG. 2 does not move in the sub-scanning direction D2. However, as a result of the medium ME1 moving in the feeding direction D3 at the time of the sub-scanning, the head 30 relatively moves in the sub-scanning direction D2 based on the medium ME1. The controller 10 and the driving section 50 repeat the main scanning for moving the head 30 in the main scanning direction D1 and the sub-scanning for relatively moving the head 30 in the sub-scanning direction D2.

The first head HE1 and the second head HE2 include the nozzle rows 33 in which the pluralities of nozzles 34 are arranged at intervals of a nozzle pitch Np in a nozzle arrangement direction D4. The nozzle arrangement direction D4 may coincide with the sub-scanning direction D2 or may be shifted in a range of an angle smaller than 90° from the sub-scanning direction D2. The pluralities of nozzles 34 included in the nozzle rows 33 shown in FIG. 2 are arranged in a row. However, a plurality of nozzles included in a nozzle row may be arranged in a zigzag. The heads HE1 and HE2 shown in FIG. 2 include, as the nozzle rows 33, nozzle rows 33C of C, nozzle rows 33M of M, nozzle rows 33Y of Y, and nozzle rows 33K of K. Naturally, the nozzles 34 included in the nozzle rows 33C eject ink droplets 37 of C, the nozzles 34 included in the nozzle rows 33M eject ink droplets 37 of M, the nozzles 34 included in the nozzle rows 33Y eject ink droplets 37 of Y, and the nozzles 34 included in the nozzle rows 33K eject ink droplets 37 of K.

The nozzles 34 provided in the first head HE1 are referred to as first nozzles NZ1. The nozzles 34 provided in the second head HE2 are referred to as second nozzles NZ2. The first head HE1 includes a plurality of first nozzles NZ1 in different positions in the sub-scanning direction D2. The second head HE2 includes a plurality of second nozzles NZ2 in different positions in the sub-scanning direction D2.

When the head 30 ejects the ink droplets 37 to the medium ME1 while moving in the main scanning direction D1, the dots DT0 by the ink droplets 37 are formed on the medium ME1. When the ink 36 ejected as the ink droplets 37 includes a plurality of output colors, for example, output colors of C, M, Y, and K, the image IM0 includes the dots DT0 of the plurality of output colors. In design, linear regions where the dots DT0 are formed on the medium ME1 along the main scanning direction D1 are referred to as rasters RA0. Smallest regions where the dots DT0 are arranged in the rasters RA0 are referred to as pixels PX0. A pitch Rp of the rasters RA0 shown in FIG. 2 is a half of the nozzle pitch Np. The plurality of dots DT0 are formed on the medium ME1 targeting the positions of the pixels PX0, whereby the image IM0 is formed on the medium ME1. The control section U0 shown in FIG. 1 performs formation of the image IM0 by ejecting the ink 36 from the heads HE1 and HE2 while relatively moving the heads HE1 and HE2 in the main scanning direction D1.

FIG. 3 schematically illustrates positional relations between the head 30 and the medium ME1 in an upper end processing section 201, a normal processing section 202, and a lower end processing section 203. FIG. 4 schematically illustrates the print PT0 in which the image IM0 is formed on the medium ME1 in the processing sections 201, 202, and 203.

The image IM0 is formed in order from the upper end ME1a to the lower end ME1b on the medium ME1. The sub-scanning direction D2 is a direction from the upper end ME1a to the lower end ME1b. Therefore, in this specific example, the upper end side S1 and the lower end side S2 are defined based on the sub-scanning direction D2. In FIG. 3, the sub-scanning direction D2 is the left direction, the upper end side S1 in the sub-scanning direction D2 is present on the right, and the lower end side S2 in the sub-scanning direction D2 is present on the left. The second head HE2 is located further on the lower end side S2 than the first head HE1.

An upper part of FIG. 3 shows the upper end processing section 201 immediately after the upper end ME1a of the medium ME1 is nipped by the paper discharge roller pair 57.

In order to form a high-definition image IM0 on the medium ME1, it is necessary to nip the medium ME1 with not only the conveying roller pair 56 present on the lower end side S2 from the heads HE1 and HE2 but also the paper discharge roller pair 57 present on the upper end side S1 from the heads HE1 and HE2. Accordingly, as shown in FIGS. 3 and 4, the upper end region A11 where only the first head HE1 is used is generated near the upper end ME1a of the medium ME1.

A middle part of FIG. 3 shows the normal processing section 202. A lower part of FIG. 3 shows the lower end processing section 203 immediately before the lower end ME1b of the medium ME1 passes through the conveying roller pair 56.

In order to form a high-definition image IM0 on the medium ME1, it is necessary to nip the medium ME1 with not only the paper discharge roller pair 57 present on the upper end side S1 from the heads HE1 and HE2 but also the conveying roller pair 56 present on the lower end side S2 from the heads HE1 and HE2. Accordingly, as shown in FIGS. 3 and 4, the lower end region A13 where only the second head HE2 is used is generated near the lower end ME1b of the medium ME1. The normal region A12 where both the heads HE1 and HE2 are used is generated between the upper end region A11 and the lower end region A13.

It is assumed that, as in the image IM0 shown in FIG. 4, in order in the sub-scanning direction D2, there are the first region A1 where both the heads HE1 and HE2 are used for formation of the image IM0, the second region A2 where both the heads HE1 and HE2 are used for formation of the image IM0, and the third region A3 where the first head HE1 is not used and the second head HE2 is used for formation of the image IM0. The third region A3 shown in FIG. 4 is the lower end region A13. The second region A2 continues to the upper end side S1 from the third region A3. The first region A1 continues to the upper end side S1 from the second region A2. In the second region A2, a rate of use of the first head HE1 to the second head HE2 has a tendency of decreasing from the upper end side S1 toward the lower end side S2.

Figure 5:
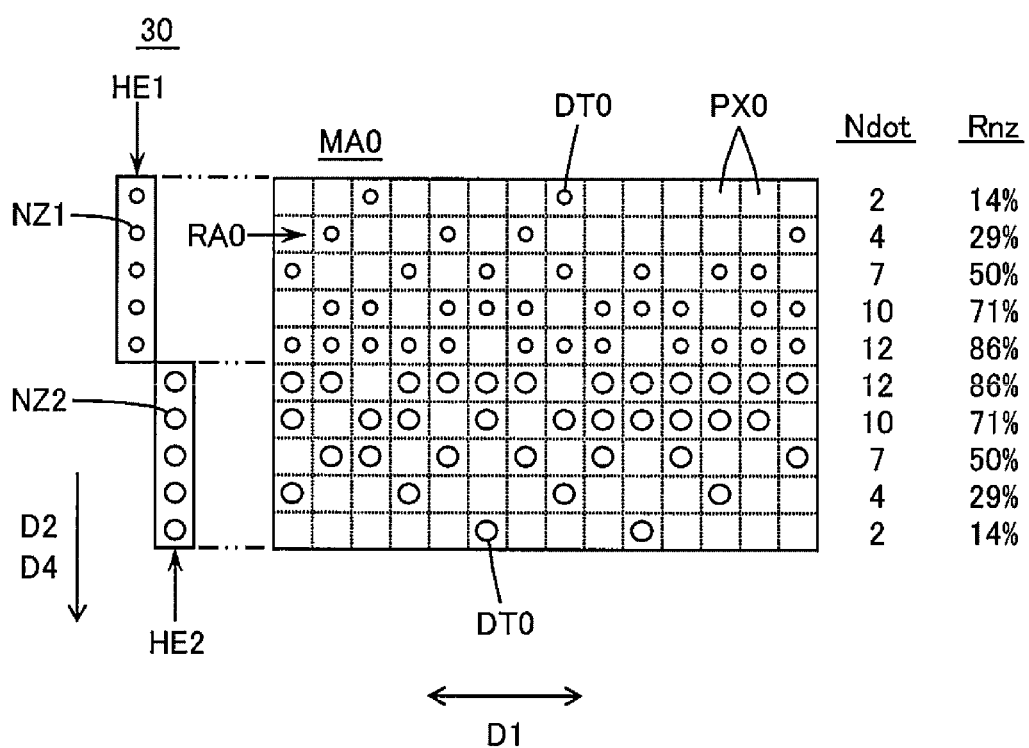
FIG. 5 is a diagram schematically showing a structure example of a dither mask.

First, a structure example of the dither mask MA0 for realizing ratios of use of the first nozzles NZ1 of the first head HE1 and the second nozzles NZ2 of the second head HE2 is explained with reference to FIG. 5. FIG. 5 schematically illustrates the structure of the dither mask MA0. In FIG. 5, rows of the nozzles NZ1 and NZ2 represent nozzle rows of any one of C, M, Y, and K. The second nozzles NZ2 are shown larger than the first nozzles NZ1. In FIG. 5, the number of each of the nozzles NZ1 and NZ2 is five. However, the heads HE1 and HE2 may include a larger number of nozzles. In the dither mask MA0, the dots DT0 generated when a gradation value, for example, 255 representing a largest amount of use of the ink 36 is stored in the pixels of the output color gradation data DA2 are shown. For convenience, dots formed by the ink droplets 37 ejected from the second nozzles NZ2 are shown larger than dots formed by the ink droplets 37 ejected from the first nozzles NZ1. A number of dots Ndot shown on the right of the dither mask MA0 indicates the number of the dots DT0 formed per unit length, for example, fourteen pixels PX0 for each of the rasters RA0. Naturally, the unit length for each of the rasters RA0 may be larger than fourteen pixels. The rate of use by nozzle Rnz shown on the right of the number of dots Ndot indicates a percentage of the number of dots Ndot with respect to the number of pixels for each of the rasters RA0.

In the dither mask MA0 shown in FIG. 5, the rate of use by nozzle Rnz of the first nozzles NZ1 increases to 14%, 29%, 50%, 71%, and 86% toward the second nozzles NZ2. The rate of use by nozzle Rnz of the second nozzles NZ2 increases toward the first nozzles NZ1. It is possible to adjust the rate of use by nozzle Rnz by changing the number of the dots DT0 generated about the rasters RA0.

Figure 6:
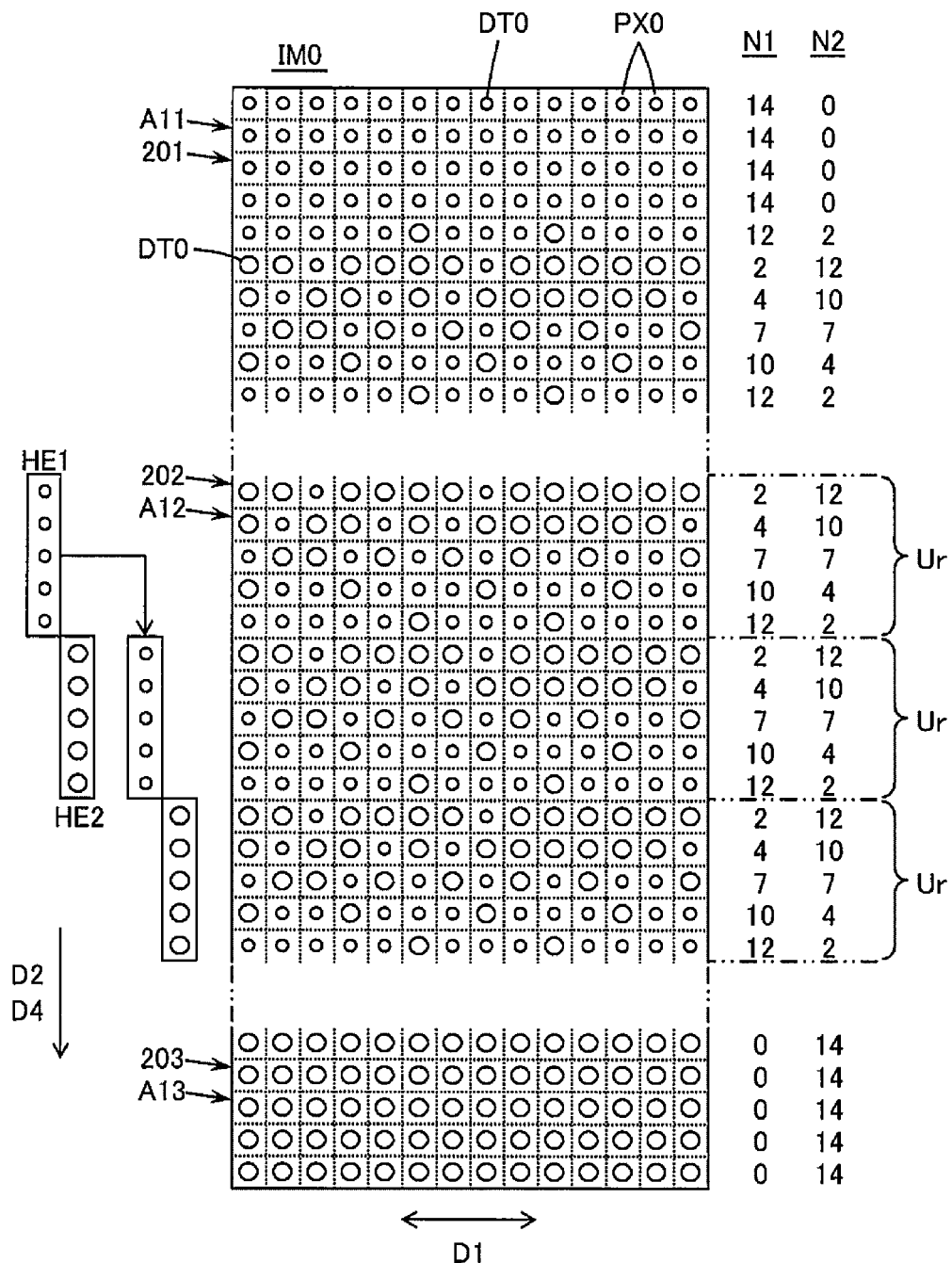
FIG. 6 is a diagram schematically showing an example of a dot pattern of an image.

FIG. 6 schematically illustrates a dot pattern of the image IM0 formed on the medium ME1 by applying the diether mask MA0 shown in FIG. 5. In FIG. 6, the image IM0, in all pixels of which the dots DT0 are formed when the sub-scanning of the heads HE1 and HE2 is performed in the normal processing section 202 such that the first head HE1 of the next path overlaps the second head HE2 of a certain path, is shown. In FIG. 6 as well, dots formed by ink droplets ejected from the second nozzles NZ2 are shown larger than dots formed by ink droplets ejected from the first nozzles NZ1. A dot number N1 shown on the right of the image IM0 indicates the number of the dots DT0 formed by the first nozzles NZ1 of the first head HE1. A dot number N2 shown on the right of the dot number N1 indicates the number of dots DT0 formed by the second nozzles NZ2 of the second head HE2.

As shown in FIG. 6, in the upper end region A11 formed in the upper end processing section 201 in the image IM0, N1=14 and N2=0 and the second head HE2 are not used and the first head HE1 is used. In the lower end region A13 formed in the lower end processing section 203 in the image IM0, N1=0 and N2=14 and the first head HE1 are not used and the second head HE2 is used. In the normal region A12, the dot numbers N1 and N2 change to N1=2, 4, 7, 10, 12 and N2=12, 10, 7, 4, 2 in a unit Ur corresponding to feeding amounts of the heads HE1 and HE2 at the time of the sub-scanning.

When the heads HE1 and HE2 are provided in the different positions in the sub-scanning direction D2, a region that can be printed on the medium ME1 by one time of main scanning increases. Therefore, printing speed is improved. However, an individual difference, that is, a difference in an ejection volume of the ink 36 between the first head HE1 and the second head HE2 occurs. The individual difference between the heads HE1 and HE2 is caused by, for example, fluctuation of an electric element. For example, it is assumed that an ejection volume of the ink 36 ejected from the first head HE1 is smaller than an ejection volume of the ink 36 ejected from the second head HE2. In this case, in the image IM0 shown in FIG. 4, the upper end region A11 is lighter than the normal region A12 and the lower end region A13 is darker than the normal region A12. As a result, a difference in concentration between the upper end region A11 and the normal region A12 is visually recognized as color unevenness. A difference in concentration between the lower end region A13 and the normal region A12 is visually recognized as color unevenness.

In this specific example, the concentration difference between the regions A11 and A12 and between the regions A12 and A13 is suppressed by changing a dot occurrence ratio in a raster RA0 unit in the dither mask MA0 shown in FIG. 5. Accordingly, printing concentration of the printing heads HE1 and HE2 is measured and the dot occurrence ratio of the dither mask MA0 is changed based on a result of the measurement. The dot occurrence ratio can be adjusted by, for example, changing a threshold of the dither mask MA0 with respect to a gradation value of the output color gradation data DA2. When an ejection volume of the ink 36 is smaller in the first head HE1 than in the second head HE2, in the dither mask MA0, a dot occurrence ratio of the raster RA0 corresponding to the first head HE1 only has to be increased and a dot occurrence ratio of the raster RA0 corresponding to the second head HE2 only has to be reduced. Consequently, the concentration difference between the upper end region A11 and the normal region A12 is suppressed and the concentration difference between the lower end region A13 and the normal region A12 is suppressed.

However, it has been found that, even if the dot occurrence ratio is changed in the raster RA0 unit, unevenness sometimes occurs in the concentration of the printing image IM0 because of an external environment such as an environment temperature. For example, in some case, even if a difference in printing concentration between the heads HE1 and HE2 is smaller at a first environment temperature, a difference in printing concentration between the heads HE1 and HE2 is large at a second environment temperature different from the first environment temperature. This is presumed to be because, although a difference in characteristics between the heads HE1 and HE2 is small at the first environment temperature, a difference in characteristics between the heads HE1 and HE2 is large at the second environment temperature. When printing concentration of the first head HE1 is higher than printing concentration of the second head HE2 at the second environment temperature, the upper end region A11 is darker than the normal region A12 and the lower end region A13 is lighter than the normal region A12. As a result, at the second environment temperature, the difference in the concentration between the upper end region A11 and the normal region A12 is visually recognized as color unevenness and the difference in the concentration between the lower end region A13 and the normal region A12 is visually recognized as color unevenness. At the second environment temperature, a concentration difference occurs between the regions A11 and A12 and between the regions A12 and A13. A boundary along the main scanning direction D1 due to a sudden change in concentration is visually recognized.

The concentration difference between the regions explained above is considered to be less easily visually recognized by gently changing rates of use of the heads HE1 and HE2 between the regions. However, it is not easy to gently reduce the rate of use of the first head HE1 to the second head HE2 in the normal region A12 to the lower end region A13. A reason for this is explained below.

FIG. 15 schematically illustrates a recording method from the normal processing section 202 until printing ends in a comparative example. In FIG. 15, relative positions of the heads HE1 and HE2 in the sub-scanning direction D2 from an n-th path to an n+3-th path are shown. On the right of the heads HE1 and HE2 of the paths, the rate of use by nozzle Rnz, which means a rate of use of nozzles that can change according to the positions of the nozzles, is shown. The rate of use by nozzle Rnz is realized by the dither mask MA0. In the n-th path and an n+1-th path, image formation of the normal processing section 202 is performed. In an n+2-th path, image formation of a lower end shift processing section 209 is performed. In an n+3-th path, image formation of the lower end processing section 203 is performed.

The recording method in the comparative example needs to satisfy a condition that a change in rates of use of the heads HE1 and HE2 of the rasters RA0 front a certain boundary B9 to the lower end side S2 along the main scanning direction D1 is set to a constant change irrespective of a page height. This is because, in order to change the dot occurrence ratio in the raster RA0 unit using the dither mask MA0, rates of use by nozzle Rnz corresponding to the rasters RA0 need to be set constant irrespective of the page height.

However, a page length is sometimes different according to the length of the medium ME1 in the sub-scanning direction D2 and the size of a margin. Therefore, as shown in FIG. 15, the lower end shift processing section 209 coupling the normal processing section 202 and the lower end processing section 203 is provided. Sub-scanning for alignment for absorbing fluctuation in the page length is carried out in the first path of the lower end processing section 203. Image formation using the first head HE1 is completed in the lower end shift processing section 209 and image formation using only the second head HE2 is performed in the lower end processing section 203 such that the ratios of use of the heads HE1 and HE2 are not changed by the alignment. As shown in FIG. 15, irrespective of whether printing ends in a printing end position E1 or printing ends in a printing end position E2, the rates of use of the heads HE1 and HE2 of the rasters RA0 in the boundary B9 to the lower end side S2 are the same without depending on the page height. A difference between the printing end positions E1 and E2 is absorbed by only the second head HE2.

It is assumed that a mating part on a lower side 211 of a dither mask used in the normal processing section 202 is automatically applied to an upper side 212 of a dither mask used in the lower end shift processing section 209. In this case, a dither mask that can be designated in the lower end shift processing section 209 is only a lower side. It is assumed that a mating part on a lower side 213 of the diether mask used in the lower end shift processing section 209 is automatically applied to an upper end 214 of the dither mask used in the lower end processing section 203. Since only the second head HE2 is used further on the lower end side S2 than the upper end 214, a dither mask cannot be designated in the lower end processing section 203. Since a dither mask cannot be freely designated in the lower end processing section 203, an extensive recording method cannot be realized.

On the other hand, the length of the medium ME1 in the sub-scanning direction D2 needs to be equal to or larger than length obtained by adding an upper end margin and a lower end margin to length at least necessary in carrying out the upper end processing section, the normal processing section 202, the lower end shift processing section 209, and the lower end processing section 203. Length necessary for the processing sections cannot be limitlessly increased to match minimum specifications of the medium ME1.

Consequently, with the recording method in the comparative example, it is difficult to gently change the rates of use of the heads HE1 and HE2 while reducing length necessary in carrying out the lower end processing section 203.

In this specific example, as illustrated in FIGS. 9 and 10, transition of the rate of use by nozzle Rnz of the normal processing section 202 may be set further on the upper end side S1 than the boundary B0 along the main scanning direction D1 and transition of the rate of use by nozzle Rnz of the lower end processing section 203 may be set further on the lower end side S2 than the boundary B0. When the heads HE1 and HE2 are present in relative positions across the boundary B0 in the sub-scanning direction D2, in this specific example, the transition of the rate of use by nozzle Rnz of the normal processing section 202 and the transition of the rate of use by nozzle Rnz of the lower end processing section 203 are combined. Consequently, as illustrated in FIGS. 11 and 12, a rate of use of the first head HE1 to the second head HE2 tends to gradually decrease from the upper end side S1 toward the lower end side S2 in the sub-scanning direction D2 in the second region A2 where the first head HE1 and the second head HE2 are used. The recording method in this specific example is explained with reference to FIGS. 7 to 14 as well.

(3) EXAMPLE OF TRANSITION OF THE RATE OF USE BY NOZZLE

Figure 7:
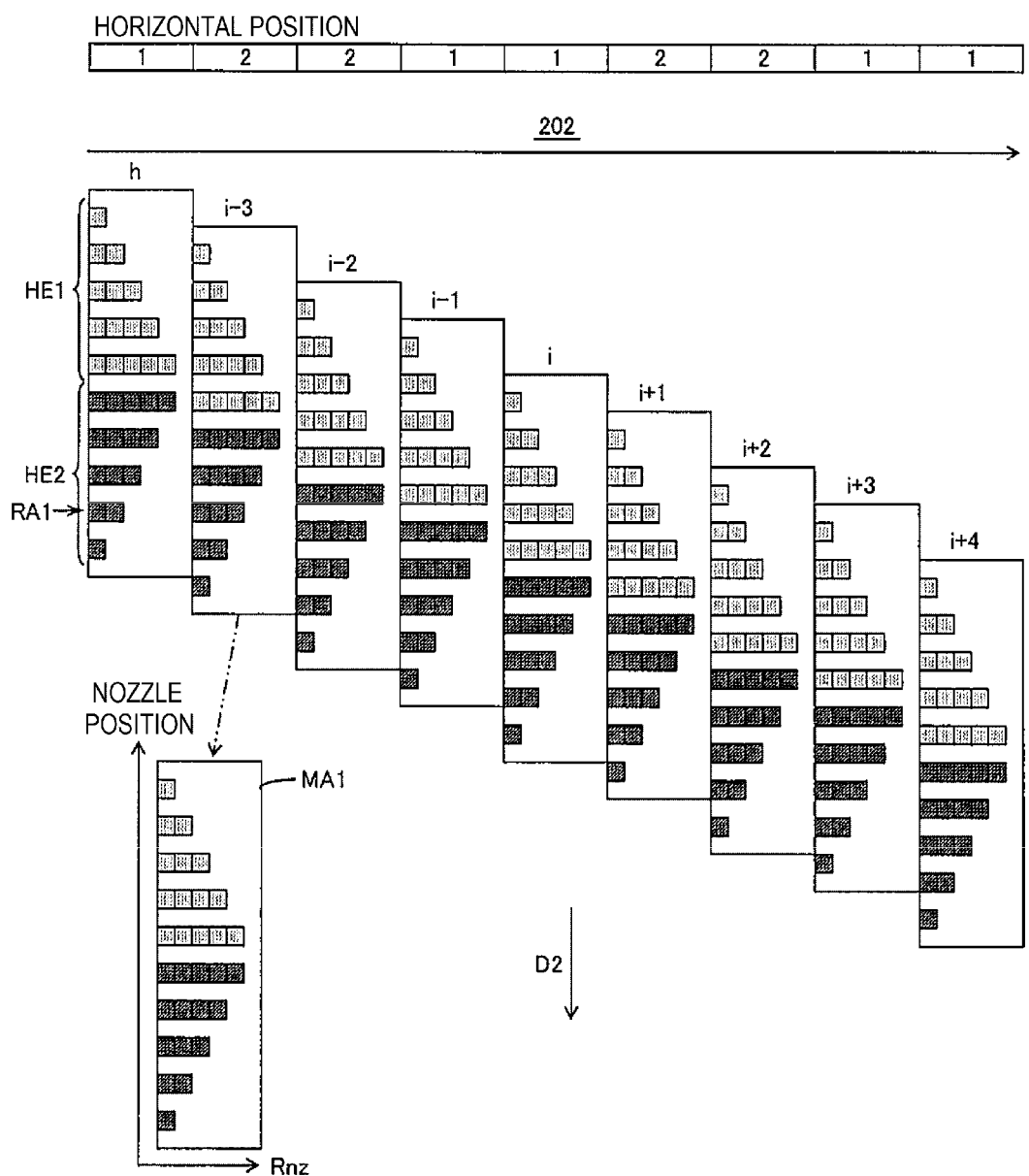
FIG. 7 is a diagram schematically showing an example of rates of use by nozzle of paths in the normal processing section.

FIG. 7 schematically illustrates the rate of use by nozzle Rnz of paths in the normal processing section 202. Referring to FIG. 2, the rate of use by nozzle Rnz means a rate of use of the nozzles 34 that can change according to the positions of the nozzles 34. In other words, the rate of use by nozzle Rnz means a rate of use of the first nozzles NZ1 and the second nozzles NZ2 with respect to the raster RA0. In FIG. 7, relative positions of the heads HE1 and HE2 in the sub-scanning direction D2 from an h-th path to an i+4-th path are shown. A mask for normal processing section MA1 is shown as a kind of the dither mask MA0 in the relative positions of the heads HE1 and HE2 of the paths. The rate of use by nozzle Rnz corresponding to the position of a nozzle is shown in the mask for normal processing section MA1. The magnitude of the rate of use by nozzle Rnz is schematically represented by the number of squares present in the mask for normal processing section MA1. The number of light hatched squares means a rate of use of the first nozzles NZ1 of the first head HE1 and the number of dark hatched squares means a rate of use of the second nozzles NZ2 of the second head HE2. Naturally, the rate of use by nozzle Rnz may be set finer than a unit of the squares shown in FIG. 7. An upper half of the mask for normal processing section MA1 corresponds to a relative position of the first head HE1. A lower half of the mask for normal processing section MA1 corresponds to a relative position of the second head HE2.

Horizontal positions shown in FIG. 7 indicate positions where the dots DT0 are formed in the raster RA0. Specifically, in the forward direction D1*l* shown in FIG. 2, a horizontal position "1" means that the dot DT0 is formed in an odd number-th pixel PX0 and a horizontal position "2" means that the dot DT0 is formed in an even number-th pixel PX0.

For convenience, assuming that h<i, where h and i are positive numbers indicating the order of the main scanning of the heads HE1 and HE2 for the image IM0, the order of the paths is shown on the heads HE1 and HE2. The numbers h and i mean any paths included in the normal processing section 202 and are not limited to an example shown in FIG. 7.

In FIG. 7, an example is shown in which the dots DT0 of the rasters RA0 are formed by four times of main scanning when the raster pitch Rp is a half of the nozzle pitch Np as shown in FIG. 2. For example, in a raster RA1, the second nozzles NZ2 are used at a rate of use of 2/12 in an h-th path, the second nozzles NZ2 are used at a rate of use of 3/12 in an i−3-th path, the first nozzles NZ1 are used at a rate of use of 4/12 in an i-th path, and the first nozzles NZ1 are used at a rate of use of 3/12 in an i+1-th path. In this case, a ratio of use of the first head HE1 to the entire heads HE1 and HE2 is 58% and a rate of use of the first head HE1 to the second head HE2 is 1.4. Printing of the image IM0 may be bidirectional printing for ejecting the ink droplets 37 from the heads HE1 and HE2 in the forward direction D11 and the backward direction D12 or may be single direction printing for ejecting the ink droplets 37 from the heads HE1 and HE2 only in the forward direction D11.

Figure 8:
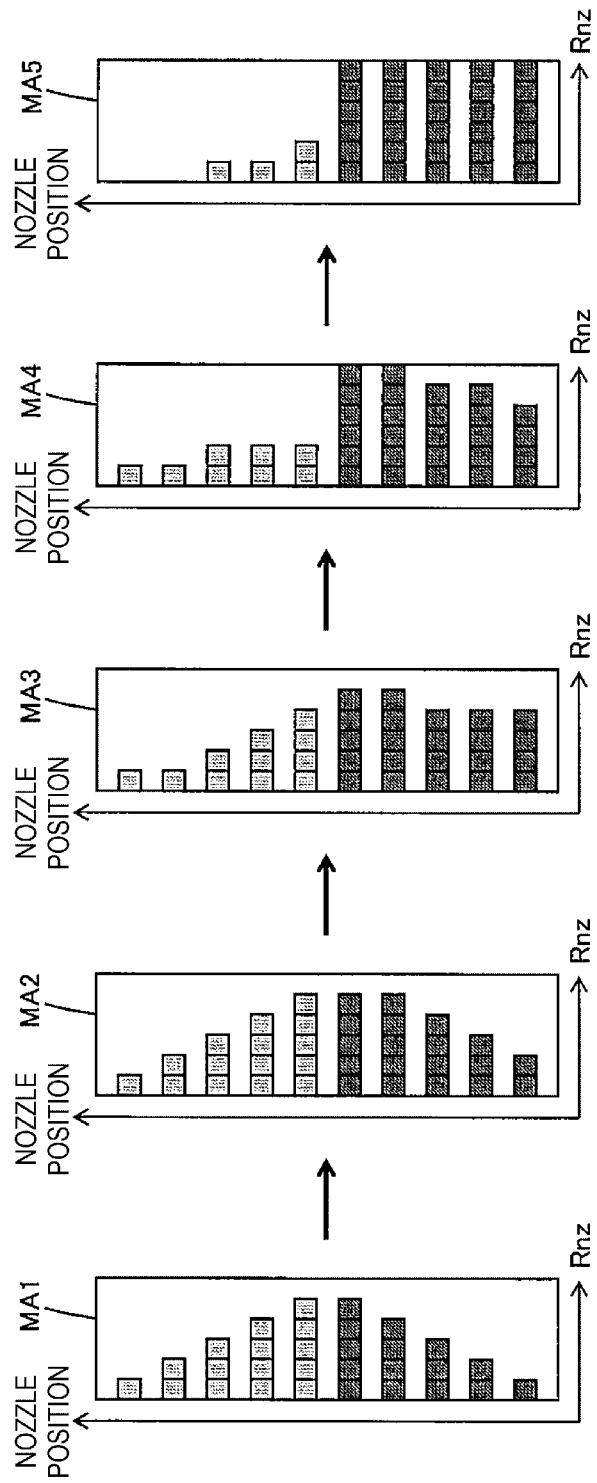
FIG. 8 is a diagram schematically showing an example of a dither mask used in the normal processing section to the lower end processing section.

FIG. 8 schematically illustrates dither masks MA1 to MA5 functioning as the dither mask MA0 used in the normal processing section 202 to the lower end processing section 203. The mask for normal processing section MA1 is as shown in FIG. 7. Masks for lower end processing section MA2 to MA5 have the rate of use by nozzle Rnz different from the rate of use by nozzle Rnz of the mask for normal processing section MA1. FIG. 8 shows that the dither mask MA0 is switched to the mask for normal processing section MA1, the mask for lower end processing section MA2, the mask for lower end processing section MA3, the mask for lower end processing section MA4, and the mask for lower end processing section MA5 stepwise as the path number increases. The rate of use of the first head HE1 to the second head HE2 decreases in order of the switching of the masks shown in FIG. 8. In this specific example, the transition of the mask for normal processing section MA1 and the transition of the masks for lower end processing section MA2 to MA5 are combined near a part where the normal processing section 202 is switched to the lower end processing section 203. The number of masks for lower end processing section is not limited to four and may be five or more or may be three or less.

FIG. 9 schematically illustrates the rates of use by nozzle Rnz of the paths in the normal processing section 202 to the lower end processing section 203 when a media feeding amount for absorbing a difference in a page height is the smallest. FIG. 10 schematically illustrates the rates of use by nozzle Rnz of the paths in the normal processing section 202 to the lower end processing section 203 when the media feeding amount for absorbing a difference in a page height is the largest. Dither masks are shown in relative positions of the heads HE1 and HE2 of the paths. The rates of use by nozzle Rnz corresponding to the positions of the nozzles are shown in the dither masks. The number of light hatched squares means a rate of use of the first nozzles NZ1 of the first head HE1. The number of dark hatched squares means a rate of use of the second nozzles NZ2 of the second head HE2.

As shown in FIGS. 9 and 10, the sub-scanning for absorbing a difference in a page height is performed between the last path of the normal processing section 202 and the first path of the lower end processing section 203. FIG. 9 shows that the media feeding amount is 0. FIG. 10 shows that the media feeding amount is a media feeding amount for two rasters.

Assuming that h<i<j<k, where h, i, j, and k are positive numbers representing the order of the main scanning of the heads HE1 and HE2 for the image IM0, the numbers h and i mean any paths included in the normal processing section 202 and are not limited to an example shown in FIGS. 9 and 10. The number j means a path immediately after the sub-scanning for absorbing a difference in a page height and may be a second or subsequent path of the lower end processing section 203. The number k means the last path in which both the heads HE1 and HE2 are used.

Consequently, the control section U0 shown in FIG. 1 performs formation of a part of the image IM0 using the heads HE1 and HE2 in a k-th path through an i-th path from an h-th path and performs formation of a part of the image IM0 using the second head HE2 without using the first head HE1 in k+1-th and subsequent paths. In an example shown in FIG. 9, the control section U0 sets a relative movement amount of the sub-scanning of the heads HE1 and HE2 between a j−1-th path and a j-th path smaller than a relative movement amount of the sub-scanning of the heads HE1 and HE2 up to the j−1-th path.

In this specific example, the boundary B0 along the main scanning direction D1 is set between the first head HE1 and the second head HE2 in the j-th path, which is the first path of the lower end processing section 203. A region further on the upper end side S1 than the boundary B0 corresponds to the first region A1 shown in FIG. 4. When a boundary B1 is set between a lowermost end where the heads HE1 and HE2 are used and an uppermost end where the first head HE1 is not used and the second head HE2 is used, a region between the boundary B0 and the boundary B1 corresponds to the second region A2 shown in FIG. 4. A region further on the lower end side S2 than the boundary B1 corresponds to the third region A3 shown in FIG. 4.

In the h-th path to the i-th path in which all the nozzles of the heads HE1 and HE2 are present further on the upper end side S1 than the boundary B0, the halftone processing section 14 generates the nozzle data DA3 using the mask for normal processing section MA1. When the rate of use by nozzle Rnz corresponding to the positions of the nozzles in the mask for normal processing section MA1 is represented as the first rate of use Rnz1, the first rate of use Rnz1 corresponding to the positions of the nozzles is the same in the h-th path to the i-th path.

In a j+4-th path to a k+2-th path in which all the nozzles of the heads HE1 and HE2 are present further on the lower end side S2 than the boundary B0, the halftone processing section 14 generates the nozzle data DA3 using the masks for lower end processing section MA4 to MA8.

In an i+1-th path to a j+3-th path, a part of the nozzles are present further on the upper end side S1 than the boundary B0 and a part of the nozzles are present further on the lower end side S2 than the boundary B0 as well. In this specific example, the transition of the mask for normal processing section MA1 is set further on the upper end side S1 than the boundary B0, the transition of the masks for lower end processing MA2 to MA8 is set further on the lower end side S2 than the boundary B0, and the transition of the mask for normal processing section MA1 and the transition of the masks for lower end processing MA2 to MA8 are combined. The specific example shown in FIGS. 9 and 10 is explained below.

In the paths of the normal processing section 202, the halftone processing section 14 applies the rate of use by nozzle Rnz of the mask for normal processing section MA1 further to the upper end side S1 than the boundary B0. In an example shown in FIG. 9, the rate of use by nozzle Rnz of the mask for normal processing section MA1 is applied further to the upper end side S1 than the boundary B0 in the i+1-th path to an i+4-th path. In an example shown in FIG. 10, the rate of use by nozzle Rnz of the mask for normal processing section MA1 is applied further to the upper end side S1 than the boundary B0 in the i+1-th path to an i+3-th path.

In the paths of the lower end processing section 203, the halftone processing section 14 applies the rates of use by nozzle Rnz of the masks for lower end processing section MA3 to MA8 further to the lower end side S2 than the boundary B0. In the examples shown in FIGS. 9 and 10, the rates of use by nozzle Rnz of the masks for lower end processing section MA3 to MA8 are applied further to the lower end side S2 than the boundary B0 in the j-th path to the k+2-th path.

Consequently, when the rate of use by nozzle Rnz of the j-th and subsequent paths is represented as a second rate of use Rnz2, the second rate of use Rnz2 is different from the first rate of use Rnz1 explained above. Therefore, the control section U0 sets the rate of use by nozzle Rnz to the second rate of use Rnz2 and performs formation of a part of the image IM0 in the j-th and subsequent paths.

In the paths of the lower end processing section 203, the halftone processing section 14 applies the transition of the rate of use by nozzle Rnz of the mask for normal processing section MA1 further to the upper end side S1 than the boundary B0. "Applies the transition" is not limited to directly applying the rate of use by nozzle Rnz of the mask for normal processing section MA1 and means that the rate of use by nozzle Rnz of the mask for normal processing section MA1 is shifted and applied to maintain a relative movement amount of the sub-scanning of the normal processing section 202. In the example shown in FIG. 10, a relative movement amount of the sub-scanning between the j−1-th path and the j-th path is the same as a relative movement amount of the sub-scanning of the normal processing section 202. In this case, the rate of use by nozzle Rnz of the mask for normal processing section MA1 is applied further to the upper end side S1 than the boundary B0 in the paths of the lower end processing section 203. In the example shown in FIG. 9, a relative movement amount of the sub-scanning between the j−1-th path and the j-th path is smaller than a relative movement amount of the sub-scanning of the normal processing section 202 by two rasters. In this case, the rate of use by nozzle Rnz of the mask for normal processing section MA1 is shifted to the lower end side S2 by two rasters and applied further to the upper end side S1 than the boundary B0 in the paths of the lower end processing section 203.

Consequently, the control section U0 sets the rate of use by nozzle Rnz about the first nozzles NZ1 present further on the upper end side S1 in the sub-scanning direction D2 than the boundary B0 in the j-th and subsequent paths to the transition of the first rate of use Rnz1 adjusted to a relative movement amount of the sub-scanning of the heads HE1 and HE2 from the h-path to the i-th path. Even if a relative movement amount of the sub-scanning of the j−1-th and subsequent paths changes from a relative movement amount of the sub-scanning before the j−1-th path, since the transition of the first rate of use Rnz1 is maintained further on the upper end side S1 than the boundary B0, the quality of the image IM0 in the first region A1 is improved.

In the paths of the normal processing section 202, the halftone processing section 14 applies the transition of the rate of use by nozzle Rnz of the mask for lower end processing section MA2 further to the lower end side S2 than the boundary B0. "Applies the transition" is not limited to directly applying the rate of use by nozzle Rnz of the mask for lower end processing section MA2 and means that the rate of use by nozzle Rnz of the mask for lower end processing section MA2 is shifted and applied to maintain a relative movement amount of the sub-scanning of the lower end processing section 203. In the example shown in FIG. 10, a relative movement amount of the sub-scanning between the j−1-th path and the j-th path is the same as a relative movement amount of the sub-scanning of the lower end processing section 203. In this case, the rate of use by nozzle Rnz of the mask for lower end processing section MA2 is applied further to the lower end side S2 than the boundary B0 in the paths of the normal processing section 202. In the example shown in FIG. 9, a relative movement amount of the sub-scanning between the j−1-th path and the j-th path is smaller than a relative movement amount of the sub-scanning of the lower end processing section 203 by two rasters. In this case, the rate of use by nozzle Rnz of the mask for lower end processing section MA2 is shifted to the upper end side S1 by two rasters and applied further to the lower end side S2 than the boundary B0 in the paths of the normal processing section 202. In both the cases, the rate of use by nozzle Rnz about the second nozzles NZ2 present further on the lower end side S2 in the sub-scanning direction D2 than the boundary B0 before the j−1-th path changes to a rate of use different from the first rate of use Rnz1.

Consequently, the control section U0 sets the rate of use by nozzle Rnz about the second nozzles NZ2 present further on the lower end side S2 in the sub-scanning direction D2 than the boundary B0 before the j−1-th path to the transition of the rate of use by nozzle Rnz of the mask for lower end processing section MA2 adjusted to a relative movement amount of the sub-scanning of the heads HE1 and HE2 of the j-th and subsequent paths. Even if a relative movement amount of the sub-scanning of the j−1-th and subsequent paths changes from a relative movement amount of the sub-scanning before the j−1-th path, since the transition of the rate of use by nozzle Rnz of the mask for lower end processing section MA2 is maintained further on the lower end side S2 than the boundary B0, the quality of the image IM0 in the second region A2 is improved.

When the heads HE1 and HE2 are present in relative positions across the boundary B0, the halftone processing section 14 combines the transition of the first rate of use Rnz1 in the normal processing section 202 and the transition of the rates of use by nozzle Rnz of the masks for lower end processing section MA2 and MA3 in the lower end processing section 203. The halftone processing section 14 generates the nozzle data DA3 such that the rate of use by nozzle Rnz is the rate of use by nozzle Rnz obtained by the combination. Therefore, when the heads HE1 and HE2 are present in the relative positions across the boundary B0, the control section U0 sets the further upper end side S1 than the boundary B0 to the transition of the rate of use by nozzle Rnz in the normal processing section 202 and sets the further lower end side S2 than the boundary B0 to the transition of the masks for lower end processing section MA2 and MA3.

FIG. 11 schematically illustrates the ratio of use R1 of the first head HE1 corresponding to the position of the raster RA0 when the media feeding amount for absorbing a difference in a page height is the smallest. FIG. 12 schematically illustrates the ratio of use R1 of the first head HE1 corresponding to the position of the raster RA0 when the media feeding amount for absorbing a difference in a page height is the largest. The ratio of use R1 of the first head HE1 means a ratio of use of the first head HE1 to both the heads HE1 and HE2. In FIGS. 11 and 12, the horizontal axis indicates raster numbers corresponding to the rasters RA0 of the image IM0 and the vertical axis indicates the ratio of use R1 of the first head HE1. The raster RA0 corresponding to the raster number is further on the lower end side S2 as the raster RA0 is larger. In FIG. 11, raster numbers 1 to 13 correspond to the first region A1, raster numbers 14 to 33 correspond to the second region A2, and a raster number 34 and subsequent raster numbers correspond to the third region A3. In FIG. 12, the raster numbers 1 to 15 correspond to the first region A1, the raster numbers 16 to 35 correspond to the second region A2, and the raster number 36 and subsequent raster numbers correspond to the third region A3.

As shown in FIGS. 11 and 12, the ratio of use R1 of the first head HE1 in the first region A1 has unevenness for each of the rasters RA0 but has a constant tendency at 50% from the upper end side S1 to the lower end side S2. The ratio of use R1 of the first head HE1 in the third region A3 is constant at 0% from the upper end side S1 to the lower end side S2. The ratio of use R1 of the first head HE1 in the second region A2 does not suddenly decrease to 0% from 50% and has unevenness for each of the rasters RA0 but has a tendency of gradually decreasing from the upper end side S1 toward the lower end side S2.

Whether the ratio of use R1 of the first head HE1 in the second region A2 has a tendency of decreasing from the upper end side S1 toward the lower end side S2 can be discriminated by calculating, with the method of least squares, an approximate straight line of the ratio of use R1 of the first head HE1 with respect to the raster number in the second region A2. When an inclination of the calculated approximate straight line is minus, that is, the ratio of use R1 of the first head HE1 decreases as the raster number increases, the ratio of use R1 of the first head HE1 in the second region A2 is considered to have a tendency of decreasing from the upper end side S1 toward the lower end side S2. When all of the ratios of use R1 of the first head HE1 calculated according to the approximate straight line with respect to a plurality of raster numbers included in the second region A2 are larger than 0% and smaller than 50%, the ratio of use R1 of the first head HE1 in the second region A2 is considered to have a tendency of gradually decreasing from the upper end side S1 toward the lower end side S2. When an approximate straight line of the ratio of use R1 of the first head HE1 with respect to the raster number is calculated about the first region A1 by the method of least squares, an inclination of the calculated approximate straight line is 0.

When a ratio of use of the second head HE2 to both the heads HE1 and HE2 is represented as R2, the rate of use R0 of the first head HE1 to the second head HE2 is represented by R1/R2. Therefore, when the ratio of use R1 of the first head HE1 has a tendency of decreasing from the upper end side S1 toward the lower end side S2, the rate of use R0 of the first head HE1 to the second head HE2 is considered to have a decreasing tendency. Naturally, by calculating, with the method of least squares, an approximate straight line of the rate of use R0 with respect to the raster number in the second region A2, it is possible to discriminate whether the rate of use R0 of the first head HE1 to the second head HE2 has a tendency of decreasing in the second region A2. When an inclination of the calculated approximate straight line is minus, the rate of use R0 of the first head HE1 to the second head HE2 is considered to have a tendency of decreasing in the second region A2. When all of the rate of use R0 of the first head HE1 calculated according to the approximate straight line with respect to the plurality of raster numbers included in the second region A2 are larger than 0 and smaller than 1, the rate of use R0 of the first head HE1 to the second head HE2 is considered to have a tendency of gradually decreasing in the second region A2.

The printer 2 in this specific example repeats the main scanning and the sub-scanning to have the ratio of use R1 of the first head HE1 shown in FIGS. 11 and 12. The printer 2 produces the print PT0 including the image IM0 as shown in FIG. 4 by ejecting the ink 36 from the heads HE1 and HE2 while relatively moving the heads HE1 and HE2 in the main scanning direction D1. Performing formation of the image IM0 in the first region A1 and the second region A2 using the heads HE1 and HE2 and performing formation of the image IM0 in the second region A2 such that the rate of use R0 of the first head HE1 to the second head HE2 has a tendency of decreasing from the upper end side S1 toward the lower end side S2 correspond to the first step. Performing formation of the image IM0 in the third region A3 using the second head HE2 without using the first head HE1 corresponds to the second step. When the second head HE2 performs printing across the second region A2 and the third region A3, the first step and the second step are considered to be simultaneously executed.

As shown in FIGS. 11 and 12, the rate of use R0 of the first head HE1 to the second head HE2 has a tendency of decreasing from the upper end side S1 to the lower end side S2 in the sub-scanning direction D2 in the second region A2 where the heads HE1 and HE2 are used. Consequently, a sudden change in concentration due to a concentration difference between the first region A1 where the heads HE1 and HE2 are used and the third region A3 where the first head HE1 is not used is suppressed. A boundary along the main scanning direction D1 is inconspicuous. Therefore, in this specific example, it is possible to reduce unevenness of an image formed when a plurality of heads are present in different positions in the sub-scanning direction.

FIG. 13 schematically illustrates the rates of use R0 of the first head HE1 corresponding to the paths when the media feeding amount for absorbing a difference in a page height is the smallest. FIG. 14 schematically illustrates the rates of use R0 of the first head HE1 corresponding to the paths when the media feeding amount for absorbing a difference in a page height is the largest. In FIGS. 13 and 14, the ratio of use R1 of the first head HE1 means a ratio of an amount of use of the first nozzles NZ1 of the first head HE1 to an amount of use of the nozzles of the entire heads HE1 and HE2 in the paths and is represented by a percentage. Amounts of use of the nozzles of the paths correspond to the numbers of squares in masks shown in FIGS. 9 and 10. For example, a mask of the j-th path shown in FIG. 9 has ten squares corresponding to the first nozzles NZ1 and has twenty-two squares corresponding to the second nozzles NZ2. In this case, the ratio of use R1 of the first head HE1 is $\{10/(10+22)\} \times 100 = 31\%$. The ratio of use R2 of the second head HE2 means a ratio of an amount of use of the second nozzles NZ2 of the second head HE2 to an amount of use of the nozzles of the entire heads HE1 and HE2 in the paths and is represented by a percentage. For example, in the case of the mask of the j-th path shown in FIG. 9, the ratio of use R2 of the second head HE2 is $\{22/(10+22)\}\times 100=69\%$. The rate of use R0 of the first head HE1 to the second head HE2 is R1/R2.

As shown in FIGS. 13 and 14, the rate of use R0 of the first head HE1 in the h-th path to the i-th path is constant at 1.000. The rate of use R0 of the first head HE1 in the k+1-th path to the k+2-th path is constant at 0.000. The rate of use R0 of the first head HE1 in the j-th path to the k-th path does not suddenly decrease to 0.000 from 1.000 and has a tendency of decreasing stepwise as the path number increases.

Whether the rate of use R0 of the first head HE1 has a tendency of decreasing as the path number increases in the j-th path to the k-th path can be discriminated by calculating, with the method of least squares, an approximate straight line of the rate of use R0 of the first head HE1 with respect to serial numbers j, j+1, j+2, . . . of the paths in the j-th path to the k-th path. When an inclination of the calculated approximate straight line is minus, that is, the rate of use R0 of the first head HE1 decreases as the serial number of the path increases, the rate of use R0 of the first head HE1 is considered to have a tendency of decreasing as the path number increases in the j-th path to the k-th path. When all of the rates of use R0 of the first head HE1 calculated according to the approximate straight line with respect to a plurality of serial numbers of the paths included in the j-th path to the k-th path are larger than 0.000 and smaller than 1.000, the rate of use R0 of the first head HE1 is considered to have a tendency of gradually decreasing as the path number increases from the j-th path to the k-th path.

The printer 2 in this specific example repeats the main scanning and the sub-scanning to have the rate of use R0 of the first head HE1 shown in FIGS. 13 and 14. The printer 2 carries out a method of producing the print PTO including the image IM0 as shown in FIG. 4 by ejecting the ink 36 from the heads HE1 and HE2 while relatively moving the heads HE1 and HE2 in the main scanning direction D1. Performing formation of a part of the image IM0 using the heads HE1 and HE2 in the i-th path to the k-th path and performing formation of a part of the image IM0 using the heads HE1 and HE2 such that the rate of use R0 of the first head HE1 to the second head HE2 has a tendency of decreasing as the path number increases in the j-th path to the k-th path correspond to the first step in the print producing method. Performing formation of a part of the image IM0 using the second head HE2 without using the first head HE1 corresponds to the second step in the print producing method.

As shown in FIGS. 13 and 14, the rate of use R0 of the first head HE1 to the second head HE2 has a tendency of decreasing as the path number increases in the j-th path to the k-th path in which the heads HE1 and HE2 are used. Consequently, a sudden change in concentration due to a concentration difference between the image IM0 of a portion formed in the i-th path to the j−1-th path in which the heads HE1 and HE2 are used and the image IM0 of a portion formed in the k+1-th and subsequent paths in which the first head HE1 is not used is suppressed. A boundary along the main scanning direction D1 is inconspicuous. Therefore, in this specific example, it is possible to reduce unevenness of an image formed when a plurality of heads are present in different positions in the sub-scanning direction.

(4) MODIFICATIONS

Various modifications of the present disclosure are conceivable.

For example, types of inks used in the printing apparatus are not limited to C, M, Y, and K and may include, in addition to C, M, Y, and K, light cyan having lower concentration than C, light magenta having lower concentration than M, dark yellow, orange, and green having higher concentration than Y, light black having lower concentration than K, and clear for improving image quality. The present technique is also applicable to a printing apparatus that does not use a part of liquid of C, M, Y, and K.

The raster pitch Rp is not limited to be a half of the nozzle pitch Np and, for example, may coincide with the nozzle pitch Np.

A relative movement amount of the sub-scanning of the head in the normal processing section to the lower end processing section may be changed according to the position of the lower end ME1$b$ detected by a sensor that detects the lower end ME1$b$ of the medium ME1. In this case as well, the present technique is applied by setting rates of use by nozzle of the paths again according to the relative movement amount of the sub-scanning.

The adjustment of the rate of use by nozzle Rnz is not limited to the adjustment by the dither mask. For example, it is also possible to generate halftone data by performing halftone processing on the entire output color gradation data DA2, specify partial data necessary for respective times of the main scanning from the halftone data, and adjust the rate of use by nozzle Rnz with a data mask applied to the partial data.

Even if the adjustment of the rate of use by nozzle Rnz is not performed, it is possible to perform formation of the image IM0 in the second region A2 such that the rate of use R0 of the first head HE1 to the second head HE2 has a tendency of decreasing from the upper end side S1 toward the lower end side S2 in the second region A2. In this case as well, an effect that unevenness of an image formed when a plurality of heads are present in different positions in the sub-scanning direction decreases is obtained.

Even if the adjustment of the rate of use by nozzle Rnz is not performed, it is possible to perform formation of a part of the image IM0 using the heads HE1 and HE2 such that the rate of use R0 of the first head HE1 to the second head HE2 has a tendency of decreasing as the path number increases in the j-th path to the k-th path. In this case as well, an effect that unevenness of an image formed when a plurality of heads are present in different positions in the sub-scanning direction decreases is obtained.

(5) CONCLUSION

As explained above, according to the present disclosure, it is possible to provide, according to the various aspects, for example, a technique for reducing unevenness of an image formed when a plurality of heads are present in different positions in the sub-scanning direction. Naturally, the basic action and effects explained above can also be obtained by a technique formed by only the constituent elements according to the independent claims.

It is also possible to carry out, for example, a configuration in which the components disclosed in the examples explained above are substituted with one another or combinations of the components are changed and a configuration in which the publicly-known techniques and the components disclosed in the examples explained above may be substituted with one another or combinations of the publicly-known techniques and the components are changed.

What is claimed is:

1. A printing apparatus comprising:
a first head;
a second head provided in a position different from a position of the first head in a sub-scanning direction; and
a control section configured to perform formation of an image by ejecting ink from the first head and the second head, wherein
the control section performs, using the first head and the second head, formation of the image in a first region and a second region present on a lower end side in the sub-scanning direction from the first region and performs, using the second head without using the first head, formation of the image in a third region present on the lower end side from the second region, and
a rate of use of the first head to the second head has a tendency of decreasing from an upper end side toward the lower end side in the sub-scanning direction in the second region.

2. The printing apparatus according to claim 1, wherein the second head is located further on the lower end side in the sub-scanning direction than the first head.

3. A printing apparatus comprising:
a first head;
a second head provided in a position different from a position of the first head in a sub-scanning direction; and
a control section configured to perform formation of an image by ejecting ink from the first head and the second head while relatively moving the first head and the second head in a main scanning direction, wherein
assuming that $i<j<k$, where i, j, and k are numbers indicating order of main scanning of the first head and the second head for the image,
the control section performs formation of a part of the image using the first head and the second head in an i-th path to a k-th path and performs formation of a part of the image using the second head without using the first head in k+1-th and subsequent paths, and
a rate of use of the first head to the second head has a tendency of decreasing as a path number increases in a j-th path to a k-th path.

4. The printing apparatus according to claim 3, wherein the control section sets a relative movement amount of the sub-scanning of the first head and the second head between the j−1-th path and the j-th path smaller than a relative movement amount of the sub-scanning of the first head and the second head up to the j−1-th path.

5. The printing apparatus according to claim 3, wherein
the first head includes a plurality of first nozzles in different positions in the sub-scanning direction,
the second head includes a plurality of second nozzles in different positions in the sub-scanning direction,
a rate of use of the first nozzles and the second nozzles with respect to a raster along the main scanning direction is set as a rate of use by nozzle,
a boundary is set between the plurality of first nozzles and the plurality of second nozzles in the j-th path,
the control section sets the rate of use by nozzle to a first rate of use and performs formation of a part of the image in an h-th path before the i-th path to the i-th path, sets the rate of use by nozzle to a second rate of use different from the first rate of use and performs formation of a part of the image in the j-th and subsequent paths, and sets the rate of use by nozzle about the first nozzle present further on the upper end side in the sub-scanning direction than the boundary in the j-th and subsequent paths to transition of the first rate of use adjusted to a relative movement amount of the sub-scanning of the first head and the second head in the h-th path to the i-th path.

6. The printing apparatus according to claim 5, wherein the control section sets the rate of use by nozzle about the second nozzle present further on the lower end side in the sub-scanning direction than the boundary before the j−1-th path to a rate of use different from the first rate of use.

7. A print producing method for producing, using a first head and a second head provided in a position different from a position of the first head in a sub-scanning direction, a print including an image by ejecting ink from the first head and the second head, the print producing method comprising:
a first step of performing, using the first head and the second head, formation of the image in a first region and a second region present on a lower end side in the sub-scanning direction from the first region; and
a second step of performing, using the second head without using the first head, formation of the image in a third region present on the lower end side from the second region, wherein
in the first step, the formation of the image in the second region is performed such that a rate of use of the first head to the second head has a tendency of decreasing from an upper end side toward the lower end side in the sub-scanning direction in the second region.

8. A print producing method for producing, using a first head and a second head provided in a position different from a position of the first head in a sub-scanning direction, a print including an image by ejecting ink from the first head and second head while relatively moving the first head and the second head in a main scanning direction, the print producing method comprising, assuming that $i<j<k$, where i, j, and k are numbers indicating the order of main scanning of the first head and the second head for the image:
a first step of performing formation of a part of the image using the first head and the second head in an i-th path to a k-th path; and
a second step of performing formation of a part of the image using the second head without using the first head in k+1-th and subsequent paths, wherein
in the first step, formation of a part of the image is performed using the first head and the second head such that a rate of use of the first head to the second head has a tendency of decreasing as the path number increases in a j-th path to a k-th path.

* * * * *